United States Patent
Riland et al.

(10) Patent No.: US 11,876,645 B1
(45) Date of Patent: Jan. 16, 2024

(54) COMMUNICATION NETWORK GATEWAYS AND ASSOCIATED METHODS

(71) Applicant: Cable Television Laboratories, Inc., Louisville, CO (US)

(72) Inventors: Chad Riland, Loveland, CO (US); Rob Alderfer, Louisville, CO (US); Dennis Alan Brown, Allen, TX (US); Jane Keys, Arvada, CO (US); John C. Bahr, Superior, CO (US); Thomas Holtzman Williams, Longmont, CO (US); Derek Digiacomo, Chester Springs, PA (US); Austin Ralph Pahl, Boulder, CO (US); Mark Davies, Louisville, CO (US); Yuan Tian, Broomfield, CO (US); Darshak Thakore, Broomfield, CO (US); David Daniel Smith, Boulder, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 18/189,926

(22) Filed: Mar. 24, 2023

Related U.S. Application Data

(60) Provisional application No. 63/325,749, filed on Mar. 31, 2022.

(51) Int. Cl.
*H04L 12/46* (2006.01)
*H04L 12/66* (2006.01)
*H04W 88/10* (2009.01)

(52) U.S. Cl.
CPC .......... *H04L 12/4641* (2013.01); *H04L 12/66* (2013.01); *H04W 88/10* (2013.01)

(58) Field of Classification Search
None
See application file for complete search history.

(56) References Cited

U.S. PATENT DOCUMENTS

2005/0190788 A1* 9/2005 Wong ................. H04L 12/4641
370/466
2010/0332615 A1* 12/2010 Short ....................... H04L 61/25
709/225

* cited by examiner

*Primary Examiner* — Hong Shao
(74) *Attorney, Agent, or Firm* — PdZ Patent Law, PLLC

(57) ABSTRACT

A method operable by a communication network gateway for providing communication services includes (a) supporting respective communication links with a plurality of communication service providers, (b) supporting a plurality of virtual local area networks (VLANs), (c) associating each virtual local area network (VLAN) with a respective communication service provider of the plurality of communication service providers, and (d) routing data between each VLAN and the respective communication link of the respective communication service provider associated with the VLAN.

14 Claims, 16 Drawing Sheets

| Wireless Access Point | Channel | Power | Bandwidth | Min. MCS |
|---|---|---|---|---|
| 118(1) | A | Medium | Large | 7 |
| 118(2) | B | Low | Medium | 7 |
| 118(3) | A | Medium | Large | 7 |

| VLAN | Max. Throughput | Data Cap |
|---|---|---|
| 144(1) | 250 Mb/s | 1 TB |
| 144(2) | 1 Gb/s | 5 TB |
| 144(3) | 10 Gb/s | - |

| Name | Unit | VLAN | Initial Password | Initial SSID | |
|---|---|---|---|---|---|
| Occupant A | 106(1) | 144(1) | ******** | 106(1)_WIFI | Delete |
| Occupant B | 106(2) | 144(2) | ******** | 106(2)_WIFI | Delete |
| Occupant C | 106(3) | 144(3) | ******** | 106(3)_WIFI | Delete |

Add New VLAN

| VLAN | No. of Clients | Identity of Clients | Guest Clients |
|---|---|---|---|
| 144(1) | 2 | 122, 130 | None |
| 144(2) | 3 | 124, 126, 134 | None |
| 144(3) | 2 | 128, 138 | None |

| WAP | No. of Clients | Identity of Clients | Interference | Guest Clients |
|---|---|---|---|---|
| 118(1) | 1 | 122 | Low | None |
| 118(2) | 2 | 124, 126 | Low | None |
| 118(3) | 1 | 128 | Low | None |

COMMUNICATION NETWORK GATEWAYS AND ASSOCIATED METHODS

CROSS REFERENCE TO RELATED APPLICATIONS

This application claims benefit of priority to U.S. Provisional Patent Application Ser. No. 63/325,749, filed on Mar. 31, 2022, which is incorporated herein by reference.

BACKGROUND

Many wireless communication systems, especially wireless communication systems operating in unlicensed radio frequency (RF) spectrum, use a listen-before-talk (LBT) procedure to help prevent collisions between wireless communication devices sharing common RF spectrum. When a collision does occur, wireless communication devices involved in the collision stop transmitting and wait a random backoff time before attempting to resume transmission. Accordingly, congestion in RF spectrum degrades wireless communication service for all wireless communication devices using the RF spectrum.

BRIEF DESCRIPTION OF THE DRAWINGS

FIG. 7 illustrates an example scenario where a management administrator accesses an administration portal of the FIG. 1 communication network gateway to add and/or delete VLANs, according to an embodiment.

FIG. 8 illustrates an example scenario where a technology administrator accesses an administration portal of the FIG. 1 communication network gateway to obtain status of wireless access points and status of VLANs, according to an embodiment.

DETAILED DESCRIPTION OF THE EMBODIMENTS

Figure 1:
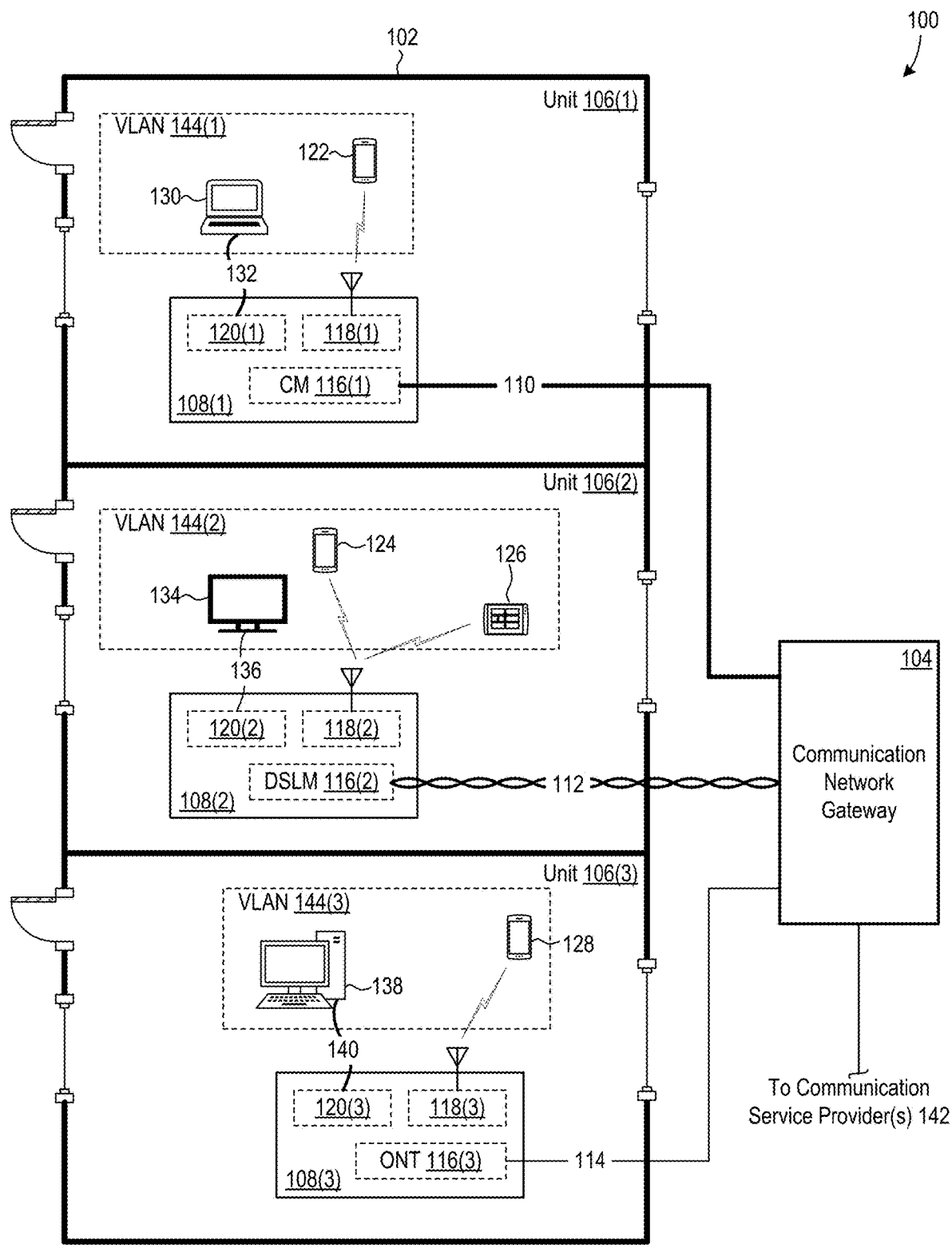
FIG. 1 is a block diagram of a communication environment including a multi-dwelling unit (MDU) building and a communication network gateway, according to an embodiment.

It may be difficult to maintain high quality wireless communication service in locations where multiple wireless access points are located in close proximity. For example, consider a multi-dwelling unit (MDU) building, such as an apartment building or a condominium building. Each unit in the MDU building typically includes one or more wireless access points, such as Wi-Fi wireless access points, for providing wireless communication services to occupants of the unit. For example, a first unit in the MDU building may include a first wireless access point served by a cable modem, while a second unit in the MDU building may first include a second wireless access point served by a digital subscriber line (DSL) modem. The wireless access points of the different units are typically associated with different parties, such as respective occupants of the units. In such case, there is conventionally no coordination between operation of the wireless access points of the different units.

However, there is often interaction between wireless access points in an MDU building due to wireless access points being in close proximity to each other. For example, wireless communication signals associated with a first wireless access point in a first unit may penetrate a wall separating the first unit from a second unit, and the first wireless access point may therefore interfere with operation of a second wireless access point in the second unit, if the two wireless access points share a common radio frequency (RF) channel. Potential for interference between wireless access points is particular acute in lower RF bands, such as the 2.4 gigahertz (GHz) band, as lower frequency wireless communication signals more readily penetrate building features, e.g., walls, ceiling, and floors, than higher frequency wireless communication signals.

Additionally, an MDU building will conventionally require separate communication infrastructure for each communication service provider that is capable of providing communication service to the MDU building. For example, assume that an MDU building developer desires for each unit occupant to be able individually select between a cable communication service provider and a DSL communication service provider, to provide communication service to the occupant's unit. In this scenario, both cable communication infrastructure and DSL communication infrastructure are required for each unit in the MDU building, to allow unit occupants to choose between the two communication service providers. Such requirement to provide multiple sets of communication infrastructure increases cost, complexity, and maintenance requirements.

Furthermore, an occupant of an MDU building unit will typically be unable to receive wireless communication service from the respective wireless access point of their unit when they are away from their unit. For example, the occupant may be unable to receive wireless communication service in common areas of their MDU building, such as in a mailroom of their MDU building or at a swimming pool of their MDU building.

Disclosed herein are new communication network gateways and associated methods which may at least partially overcome the above discussed problems. For example, certain embodiments enable coordination of operation of wireless access points in different units of a MDU building, such as to coordinate RF transmission power, operating RF channels, RF channel bandwidth, modulation coding scheme (MCS), selection of network clients, etc., to help minimize interference among wireless access point, as well as to help optimize communication resources of the wireless access points, and thereby promote high communication system performance. Additionally, some embodiments are configured to achieve such coordination even when the wireless access points are heterogenous, e.g., when the wireless access points are of different models and/or are supported by different communication service providers.

Furthermore, particular embodiments of the new communication gateways are configured to support multiple virtual local area networks (VLANs), such as a respective VLAN for each unit of a MDU building and/or a respective VLAN for each occupant of a MDU building, thereby promoting security as well as enabling customized communication service for MDU building units and/or MDU building occupants. Certain embodiments enable an MDU building occupant to access to their respective VLAN via a wireless access point of another occupant's unit, thereby helping achieve ubiquitous communication service throughout the MDU building. Additionally, some embodiments provide a wired client interface to each unit of a MDU building, to allow occupants of the unit to access their respective VLAN via a wired connection, even if the MDU building does not have networking cables, e.g., category 5 Ethernet electrical cables, category 6 Ethernet electrical cables, or fiber optic cables, running to the unit.

Moreover, some embodiments achieve convergence of communication service providers at a logical edge of a MDU building, thereby reducing, or even eliminating, the need to provide communication infrastructure for multiple communication service providers throughout the MDU building. For example, in some embodiments, a communication network gateway supports respective communication links with multiple service providers, and the communication network gateway is configured to route traffic between a given VLAN and one or more of the communication service providers according to one or more criteria, such as according to which communication service provider a party associated with the VLAN subscribes to. As another example, some embodiments enable an occupant of an MDU building unit to establish service with a communication service provider, terminate communication service with a communication service provider, or switch communication service providers, without requiring a change in communication infrastructure in the MDU building. Additionally, some embodiments are configured to aggregate communication resources of respective communication links of two or more communication service providers.

Additionally, certain embodiments support one or more portals to enable one or more of communication network configuration, communication network administration, communication network maintenance, etc., to be performed via the new communication network gateways. For example, some embodiments support a portal enabling a user, e.g., an occupant of an MDU building unit, to select or change which communication service provider provides communication service to their respective unit and/or VLAN. As another example, particular embodiments support a portal enabling a party, or even an automated system (e.g., using machine learning or artificial intelligence), to configure and/or optimize one or more communication networks parameters, such as VLAN parameters, wireless access point parameters, etc. Furthermore, some embodiments support one or more of the aforementioned portals even in embodiments including heterogenous communication network elements, e.g., heterogenous wireless access points. Moreover, some embodiments are configured to provide communication network status, such as via dashboard or an application on user equipment.

While the new communication network gateways are discussed below primarily with respect to MDU buildings, it is understood that the communication networks gateways are not limited to MDU buildings. For example, the communication network gateways may be used in other buildings where multiple wireless access points are in close proximity, and/or in other buildings where different parties occupy different respective portions of the building, such as in office buildings, convention centers, or shopping centers. As another example, the communication network gateways may be used in outdoor applications where multiple wireless access points are in close proximity, or in outdoor applications where multiple parties in close proximity require their own communication service.

FIG. 1 is a block diagram of a communication environment 100 including a MDU building 102 and a communication network gateway 104, where communication network gateway 104 is one embodiment of the new communication network gateways disclosed herein. MDU building 102 is, for example, an apartment building, a condominium building, a hotel, a dormitory, a hospital, a retirement home, a nursing home, etc. MDU building 102 includes a plurality of units 106, where each unit 106 is, for example, an apartment, a condominium, a room, etc. In this document, specific instances of an item may be referred to by use of a numeral in parentheses (e.g., unit 106(1)) while numerals without parentheses refer to any such item (e.g., units 106). While MDU building 102 is depicted as including three units 106, it is understood that the number of units 106 in MDU building 102 may vary, and in some applications, MDU building 102 may include tens of units 106, hundreds of units 106, thousands of units 106, or even more units 106. Each unit 106 need not have the same configuration.

Each unit 106 includes a communication termination device 108 communicatively coupled to communication network gateway 104. Each communication termination device 108 is, for example, associated with (a) a respective communication service subscriber, (b) a respective unit 106, or (c) a respective occupant of a unit 106. While communication network gateway 104 is depicted as being external to MDU building 102, it is understood that communication network gateway 104 may be partially or completely located within MDU building 102, such as in an electrical closet (not shown) of MDU building 102, or in a communication closet (not shown) of MDU building 102. Alternately, communication network gateway 104 could be located on an exterior of MDU building 102, such as on an exterior wall of MDU building 102. Communication network gateway 104 could alternately be partially or completely remote from MDU building 102, such as in a central communication network hub or in a remote communication network hub. Additionally, communication network gateway 104 could be partially or completely implemented in a distributed computing environment, such as in a cloud computing environment.

In some embodiments, one or more communication termination devices 108 are communicatively coupled to communication network gateway 104 via communication infrastructure that was present in MDU building 102 before deployment of communication network gateway 104, such as coaxial electrical cable, twisted pair electrical cable, and/or fiber optic cable. For example, FIG. 1 depicts (a) communication termination device 108(1) being communicatively coupled to communication network gateway 104 via a coaxial electrical cable 110, (b) communication termination device 108(2) being communicatively coupled to communication network gateway 104 via a twisted pair electrical cable 112, and (c) communication termination device 108(3) being communicatively coupled to communication network gateway 104 via a fiber optic cable 114. Communication termination devices 108 could also be wirelessly communicatively coupled to communication network gateway 104, such as using a RF wireless communication link or a free space optical wireless communication link, e.g., using a LiFi optical wireless communication link.

Communication termination devices 108 are configured to communicatively couple network clients to one or more communication networks, e.g., to one or more VLANs established and supported by communication network gateway 104. Each communication termination device 108 includes a network interface 116, a wireless access point 118, and a wired client interface 120. In some alternate embodiments, one or more communication termination device 108 include only one of wireless access point 118 and wired client interface 120, instead of both of wireless access point 118 and wired client interface 120. Additionally, one or more communication termination devices 108 may include additional elements (not pictured). While FIG. 1 illustrates the constituent elements of each communication termination device 108 being co-packaged, in certain embodiments, some or all constituent elements of one or more communication termination devices 108 are separately packaged. For example, a wireless access point 118 and a network interface 116 may be separately packaged but communicatively coupled via an electrical cable, an optical cable, and/or a wireless communication link. In embodiments where constituent elements of a communication termination device 108 are co-packaged, the communication termination device 108 may alternately be referred to as a premises gateway or a subscriber gateway.

Each network interface 116 is configured to communicatively couple its respective communication termination device 108 to communication network gateway 104 via one or more communication mediums. For example, network interface 116(1) is a cable modem (CM) configured to communicatively couple communication termination device 108(1) with communication network gateway 104 via coaxial electrical cable 110, such as using a Data Over Cable Service Interface Specification (DOCSIS) communication protocol. Additionally, network interface 116(2) is a DSL modem (DSLM) configured to communicatively couple communication termination device 108(2) with communication network gateway 104 via twisted pair electrical cable 112, such as using a DSL communication protocol. Furthermore, network interface 116(3) includes an optical network terminal (ONT) configured to communicatively couple communication termination device 108(3) with communication network gateway 104 via fiber optic cable 114, such as using an Ethernet passive optical network (EPON) communication protocol, a radio frequency of over glass (RFOG) communication protocol, a Gigabit-capable passive optical network (GPON) communication protocol, an XPON communication protocol, or a coherent passive optical network (CPON) communication protocol (point-to-point, point-to-multipoint, cascaded, etc.).

Figure 2:
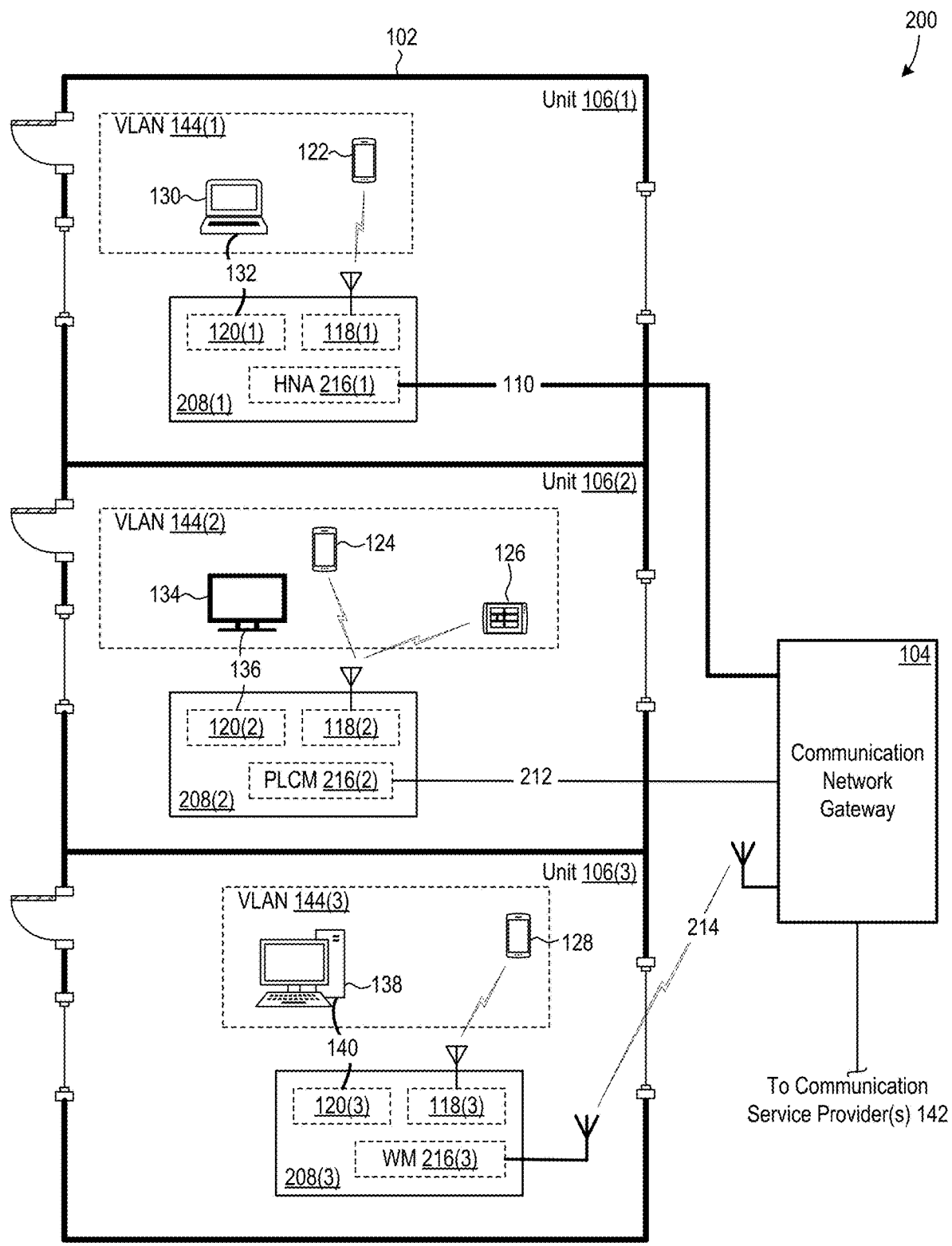
FIG. 2 is a block diagram of an alternate embodiment of the FIG. 1 communication environment including a home networking adapter, a power line communication modem, and a wireless modem in place of a cable modem, a digital subscriber line (DSL) modem, and an optical network terminal, respectively.

A network interface 116 could take other forms than those of FIG. 1 as long as the network interface 116 is capable of communicating with communication network gateway 104. For example, FIG. 2 is a block diagram of a communication environment 200, which is an alternate embodiment of communication environment 100 where communication termination devices 108(1), 108(2), and 108(3) are replaced with communication termination devices 208(1), 208(2), and 208(3), respectively. Communication termination device 208(1) includes a home networking adapter (HMA) 216(1) in place of cable modem 116(1), and home networking adapter 216(1) communicates with communication network gateway 104 via coaxial electrical cable 110 using a home working communication protocol, e.g., a Multi-Media over Coax (MoCA) communication protocol or a HomePNA (G.hn) communication protocol. Home networking adapter 216 could alternately be communicatively coupled to communication network gateway 104 via one or more communication mediums other than, or in addition to, coaxial electrical cable 110. Communication termination device 208(2) includes a power line communication modem (PLCM) 216(2) in place of DSL modem 116(2), and power line communication modem 216(2) communicates with communication network gateway 104 via a power line 212. Additionally, communication termination device 208(3) includes a wireless modem (WM) 216(3) in place of ONT 116(3), and wireless modem 216(3) communicates with communication network gateway 104 via RF wireless communication signals 214. In an alternate embodiment, wireless modem 216(3) is replaced with a LiFi adapter configured to communicate with communication network gateway 104 according to a LiFi communication protocol.

Referring again to FIG. 1, each wireless access point 118 is configured to wirelessly interface one or more network clients with its respective communication termination device 108 via radio RF signals or free space optical signals. In this document, a "network client" may be either a tangible information technology device or an intangible application running on an information technology device or other type of device. Examples of network clients include, but are not limited to, a mobile telephone, a computer, a set-top device, a data storage device, an Internet of Things (IoT) device, an entertainment device, a computer networking device, a smartwatch, a wearable device with wireless capability, a medical device, a wireless access device (including, for example an evolved NodeB (eNB), a next generation NodeB (gNB), an Institute of Electrical and Electronics Engineers (IEEE) 802.11-based wireless access point, an Integrated Access and Backhaul (IAB) access point, a microcell, a picocell, a femtocell, a macrocell, a repeater or range extender, and IEEE 802.11-based application), an application with communication capability, a software or firmware element with communication capability, etc. FIG. 1 depicts wireless access point 118(1) wirelessly interfacing a network client in the form of a mobile phone 122 with communication termination device 108(1). Additionally, FIG. 1 illustrates wireless access point 118(2) wirelessly interfacing two network clients in the form of a mobile phone 124 and a tablet computer 126 with communication termination device 108(2). Furthermore, FIG. 1 depicts wireless access point 118(3) wirelessly interfacing a network client in the form of a mobile phone 128 with communication termination device 108(3).

In some embodiments, one or more wireless access points 118 are configured to wirelessly communicate with one or more network clients at least partially based on one or more of (a) an IEEE 802.11-based wireless communication protocol, e.g., a Wi-Fi wireless communication protocol, (b) a cellular wireless communication protocol, e.g., a 3rd Generation Partnership Project (3GPPP)-based communication protocol, such as a Long Term Evolution (LTE) communication protocol, a Fifth Generation (5G) communication protocol, or a sixth (6G) communication protocol, (c) a Bluetooth wireless communication protocol, (d) a long range (LoRa) wireless communication protocol, (e) a Zigbee wireless communication protocol, (f) a Z-Wave wireless communication protocol, (g) a Wi-Fi direct wireless communication protocol, and (h) a LiFi wireless communication protocol. Each wireless access point 118 wirelessly communicates with one or more network clients using unlicensed RF spectrum, licensed RF spectrum, or a combination of licensed and unlicensed RF spectrum. Certain embodiments of wireless access points 118 are configured to wirelessly communicate with one or more network clients using a 900 Megahertz (MHz) frequency band, a 2.4 GHz frequency band, a 3.6 GHz frequency band, a 4.9 GHz frequency band, a 5 GHz frequency band, a 5.9 GHz frequency band, a 6 GHz frequency band, and a 60 GHz frequency band.

While each wireless access point 118 is depicted as a single element, each wireless access point 118 may include multiple elements, such as two or more radio transceivers, to enable the wireless access point to communicate with one or more network clients using two or more frequency bands and/or two or more communication protocols. For example, certain embodiments of wireless access points 118 are capable of communicating with network clients using Wi-Fi communication protocols in two or more frequency bands.

As another example, some embodiments of wireless access points 118 are capable of communicating with network clients using (a) one or more Wi-Fi wireless communication protocols and (b) one or more cellular wireless communication protocols, e.g., a 3GPP-based communication protocol, such as an LTE communication protocol, a 5G communication protocol, and/or a 6G communication protocol, to provide access to a public cellular wireless communication network and/or a private cellular wireless communication network in MDU building 102.

Figure 3:
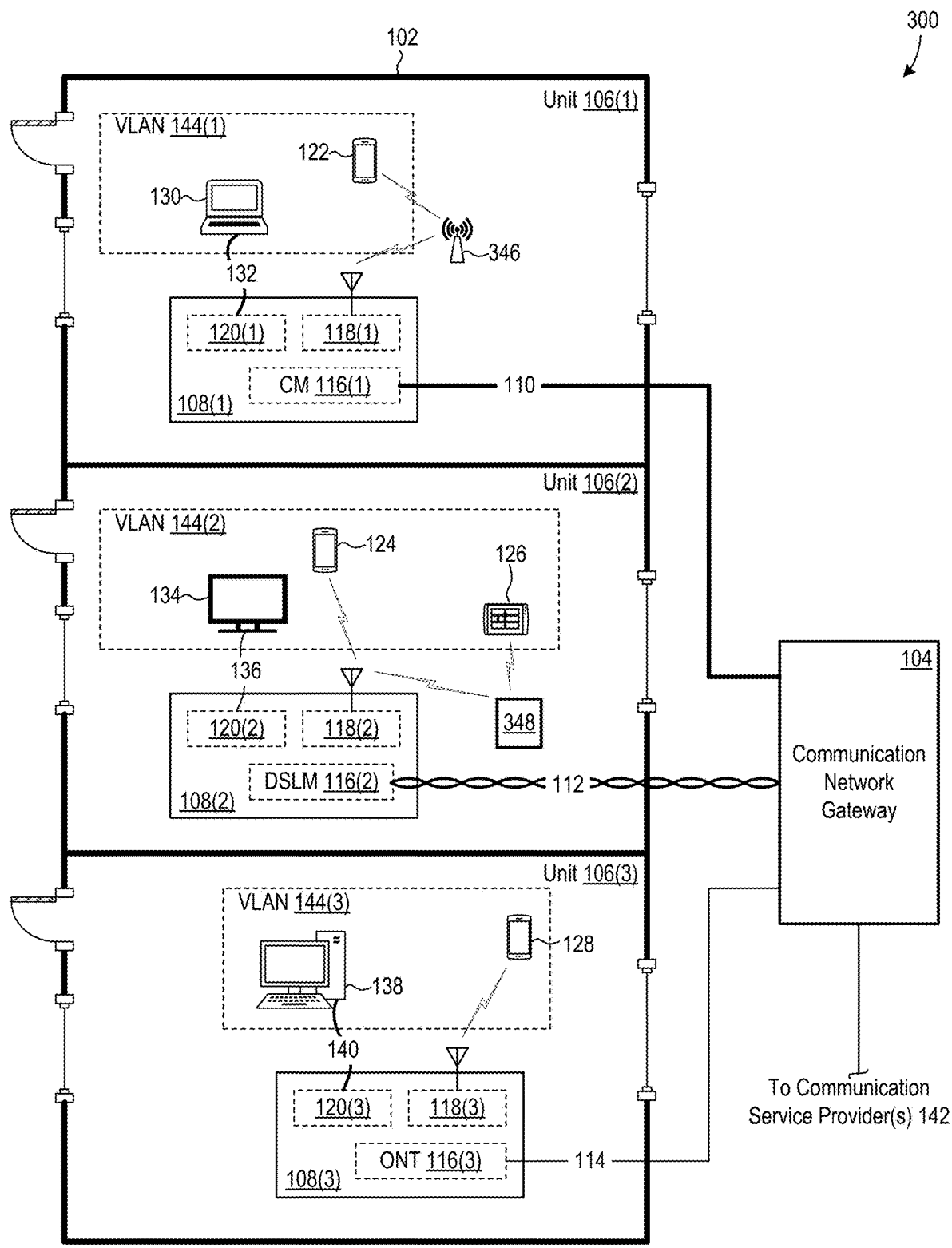
FIG. 3 is a block diagram of an alternate embodiment of the FIG. 1 communication environment further including a range extender and a content streaming device.

Additionally, one or more wireless access points 118 may wirelessly communicate with one or more network clients via one or more range extenders, repeaters, relays, or similar devices. For example, FIG. 3 is a block diagram of a communication environment 300, which is an alternate embodiment of communication environment 100 where wireless access point 118(1) wirelessly communicates with mobile phone 122 via a range extender 346. Additionally, wireless access point 118(2) wirelessly communicates with tablet computer 126 via a content streaming device 348, where content streaming device 348 includes a wireless access point (not shown). In some embodiments, content streaming device 348 is a video streaming device.

Referring again to FIG. 1, each wired client interface 120 is configured to interface one or more network clients with its respective communication termination device 108 via one or more cables, such as electrical cables and/or optical cables. In some embodiments, each wired client interface 120 includes one or more of an electrical Ethernet port, an optical Ethernet port, and a home networking port (e.g., operating according to a MoCA communication protocol and/or a G.hn communication protocol). FIG. 1 depicts wired client interface 120(1) interfacing a network client in the form of a notebook computer 130 to communication termination device 108(1) via an electrical Ethernet cable 132. Additionally, FIG. 1 illustrates wired client interface 120(2) interfacing a network client in the form of a television 134 to communication termination device 108(2) via an optical Ethernet cable 136, and FIG. 1 illustrates wired client interface 120(3) interfacing a network client in the form of a computer workstation 138 to communication termination device 108(3) via a coaxial electrical cable 140 using a home networking communication protocol.

Communication network gateway 104 is configured to communicatively couple each communication termination device 108 with one or more communication service providers 142, such that each network client can communicate with communication service providers 142 via one or more communication termination devices 108. Examples of communication service providers 142 include one or more of (a) a cable communication service provider, e.g., operating according to a DOCSIS communication protocol, (b) a DSL communication service provider, e.g., operating according to a DSL communication protocol, (c) an optical communication service provider, e.g., operating according to an EPON, RFOG, GPON, XPON, or CPON communication protocol, (d) a public or private cellular communication service provider, e.g., operating according to a LTE, 5G, 6G, or other 3GPP communication protocol, (f) a satellite communication service provider, e.g., using very low earth orbit (VLEO) satellites, low earth orbit (LEO) satellites, medium earth orbit (MEO) satellites, or geostationary equatorial orbit (GEO) satellites, and (g) a free space optical communication service provider, e.g., operating according to a LiFi communication protocol.

Particular embodiments of communication network gateway 104 are further configured to control one or more operating parameters of wireless access points 118, thereby enabling coordination of operation of wireless access points 118. Coordination of operation of wireless access points 118 may advantageously help prevent interference between wireless access points 118 and/or to help maximize communication resources of wireless access points 118. Certain embodiments of communication network gateway 104 are configured to control one or more operating parameters of wireless access points 118 in response to commands received by communication network gateway 104, e.g., in response to commands received via an administration portal, such as for coordination operation of wireless access points 118. Additionally, some embodiments of communication network gateway 104 are configured to automatically control one or more operating parameters of wireless access points 118 to coordinate operation of wireless access points 118, such as to automatically minimize interference between wireless access points 118 and/or to optimize communication resources of wireless access points 118.

The following are several examples of how some embodiments of communication network gateway 104 may be used to manually or automatically coordinate operation of wireless access points 118. It is understood, though, that communication network gateway 104 is not limited to operating according to these examples.

(A) RF channel selection: certain embodiments of communication network gateway 104 are configured to enable coordination of operation of wireless access points 118 by individually controlling RF channel selection of each wireless access point 118, such as to help prevent interference between wireless access points 118 having overlapping coverage areas. For example, communication network gateway 104 may control two wireless access points 118 having overlapping coverage areas such that they operate on different respective RF channels, to prevent interference between the two wireless access points 118.

(B) RF transmission power level: certain embodiments of communication network gateway 104 are configured to enable coordination of operation of wireless access points 118 by individually controlling RF transmission power level of each wireless access point 118, such as to help prevent interference between wireless access points 118 having overlapping coverage areas. For example, communication network gateway 104 may control two wireless access points 118 having potentially overlapping coverage areas such that their RF transmission power levels are sufficiently low to prevent RF transmission for each wireless access point 118 from significantly interfering with operation of the other wireless access point 118.

(C) MCS: certain embodiments of communication network gateway 104 are configured to enable coordination of operation of wireless access points 118 by individually controlling MCS, e.g., a minimum MCS, of each wireless access point 118. For example, communication network gateway 104 may control a minimum MCS of two wireless access points 118 having overlapping coverage areas to prevent interference between the two wireless access points 118

(D) RF channel bandwidth: certain embodiments of communication network gateway 104 are configured to enable coordination of operation of wireless access points 118 by individually controlling RF channel bandwidth of each wireless access point 118, such as to help prevent interference between wireless access points 118 having overlapping coverage areas while maximizing use of available RF spectrum in MDU building 102. For example, a communication network gateway 104 may control two wireless access points 118 having potentially overlapping coverage such that a first wireless access point 118 having a high load uses a large RF channel bandwidth while a second wireless access point 118 having low load uses a small RF channel bandwidth.

(E) Network client selection: certain embodiments of communication network gateway 104 are configured to enable coordination of operation of wireless access points 118 by selecting network clients of the wireless access points 118, i.e., by controlling which respective wireless access point 118 serves each network client. For example, assume that (a) a network client is within range of a first wireless access point 118 and a second wireless access point 118, and (b) the first wireless access point 118 is substantially more loaded that the second wireless access point 118. Communication network gateway 104 may control the first wireless access point 118, the second wireless access point 118, and/or the network client, such that the second wireless access point 118 serves the network client, to help prevent further loading of the first wireless access point 118 and thereby promote load balance among the two wireless access points 118.

Particular embodiments of communication network gateway 104 are advantageously capable of controlling one or more operating parameters of wireless access points 118 as discussed above even if the wireless access points 118 are heterogenous, e.g., two or more of wireless access points 118 are of different models and/or are served by different communication service providers 142. For example, in some embodiments, wireless access points 118 are heterogenous, but each wireless access point 118 includes a management application programming interface (API) that enables communication network gateway 104 to control one or more operating parameters of the wireless access point 118, such as RF channel selection, RF channel bandwidth, MCS, and/or RF transmission power level, thereby enabling communication network gateway 104 to coordinate operation of disparate wireless access points 118 by controlling their operating parameters.

Furthermore, certain embodiments of communication network gateway 104 are configured to use software defined network (SDN) to establish and support a plurality of VLANs in MDU building 102, such as a respective VLAN for each unit 106 of MDU building 102, a respective VLAN for each subscriber to a communication service provider 142 in MDU building 102, and/or a respective VLAN for each occupant of MDU building 102. For example, FIG. 1 depicts communication network gateway 104 supporting a respective VLAN 144 for each unit 106. In particular, a VLAN 144(1) is associated with unit 106(1), and VLAN 144(1) includes mobile phone 122 and notebook computer 130. Additionally, a VLAN 144(2) is associated with unit 106(2), and VLAN 144(2) includes mobile phone 124, tablet computer 126, and television 134. Furthermore, a VLAN 144(3) is associated with unit 106(3), and VLAN 144(3) includes mobile phone 128 and computer workstation 138. Some embodiments of communication network gateway 104 are configured to require a network client wishing to join a given VLAN 144 to be authorized to join the VLAN 144, and/or the network client to authenticate itself, before the network client is permitted to join the VLAN 144, thereby promoting VLAN security. Certain embodiments of communication network gateway 104 are configured to automatically establish and/or delete a VLAN 144. For example, communication network gateway 104 may be configured to automatically establish a VLAN 144 for a given unit 106 in response to a signal indicating that a party has moved into the unit 106, and communication network gateway 104 may be configured to automatically delete a VLAN 144 associated with a given unit 106 in response to a signal indicating that a party has moved out of the unit 106.

Each VLAN 144 is logically separate from each other VLAN 144, even though two or more VLANs may be at least partially supported by common communication network infrastructure, such as common wireless access points 118 and/or a common service set identifier (SSID). For example, in certain embodiments, each VLAN 144 is a respective subnetwork of a primary network supported by communication network gateway 104. The fact that each VLAN 144 is logically separate from each other VLAN 144 promotes security by logically separating data associated with each VLAN 144 from data associated with each other VLAN 144. Additionally, the fact that each VLAN 144 is logically separate from each other VLAN 144 enables custom configuration of each VLAN 144. For example, in some embodiments, communication network gateway 104 enables a party associated with each unit 106 to configure one or more parameters of its respective VLAN 144, such as identify of network clients that are permitted to access the VLAN 144, security credentials for the VLAN 144, parental controls for the VLAN 144, a backup communication link for the VLAN 144 (e.g., using a mobile hotspot connected to the VLAN 144 or an alternate communication service provider 142), etc. As another example, certain embodiments of communication network gateway 104 enable individual configuration of each VLAN 144 to set one or more of a maximum throughput of the VLAN 144, a data cap of the VLAN, time of day restrictions of the VLAN, etc. As an additional example, particular embodiments of communication network gateway 104 enable individual configuration of each VLAN 144 to set quality of service (QoS) of the VLAN 144, redundant communication links available for use by the VLAN 144, operations support systems (OSS) attributes of the VLAN 144, business support systems attributes of the VLAN 144, and security models of the VLAN 144.

Figure 4:
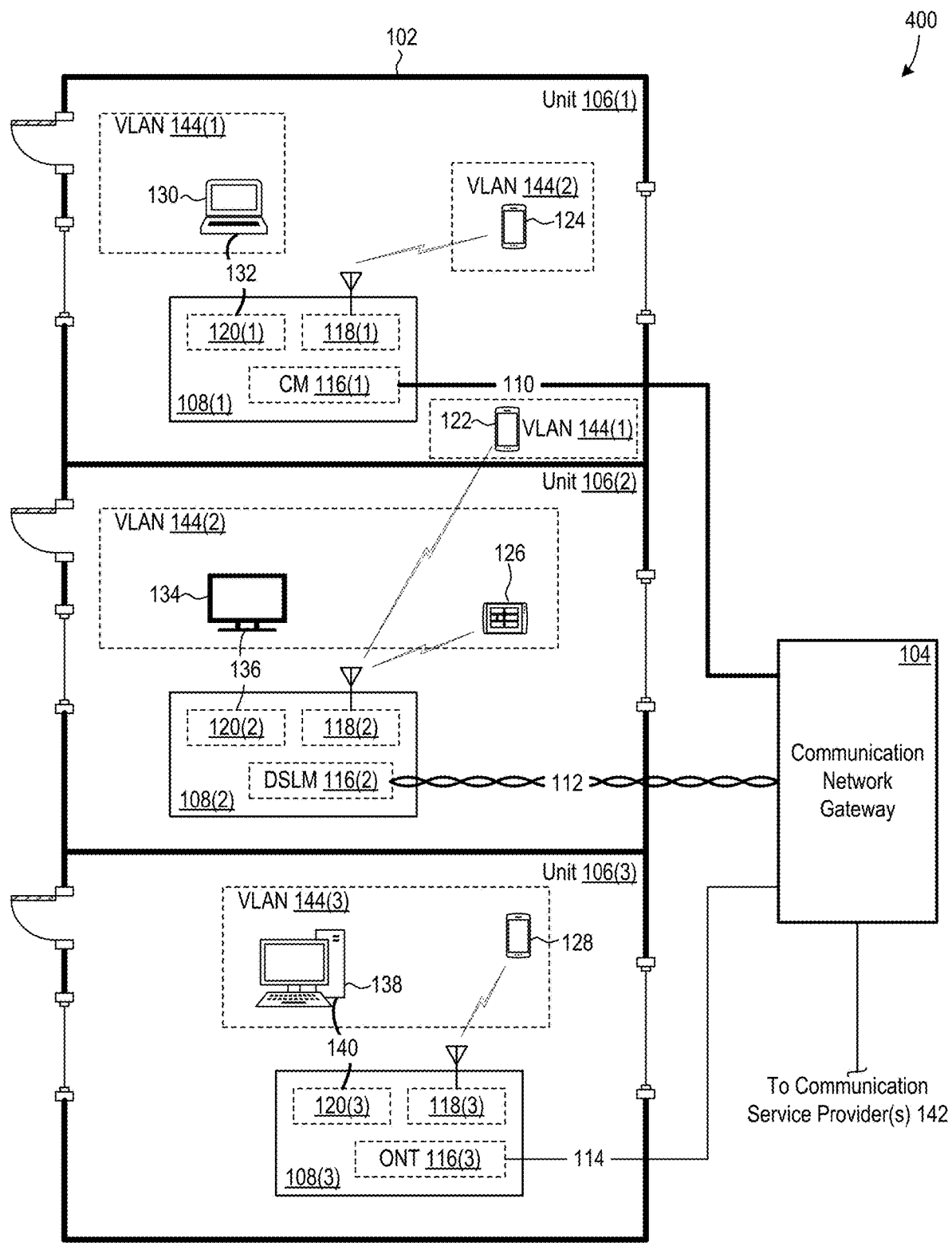
FIG. 4 is a block diagram of an alternate embodiment of the FIG. 1 communication environment where two network clients in the MDU building have been moved to different locations.

Furthermore, some embodiments of communication network gateway 104 are configured to support a given VLAN 144 across multiple communication termination devices 108, such as to enable a party to access their VLAN 144 outside of their respective unit 106, or to help optimize communication resources of communication termination devices 108. For example, FIG. 4 is a block diagram of a communication environment 400, which is an alternate embodiment of communication environment 100 (FIG. 1) where two network clients in MDU building 102 have been moved to different locations. In particular, mobile phone 122 has been moved within unit 106(1) to a location near unit 106(2), such that mobile phone 122 is now better served by wireless access point 118(2) than wireless access point 118(1). In response thereto, communication network gateway 104 causes wireless access point 118(2), instead of wireless access point 118(1), to serve mobile phone 122. Although mobile phone 122 is now being served by wireless access point 118(2) of unit 106(2), mobile phone 122 is still part of VLAN 144(1), and the transition of mobile phone 122 from wireless access point 118(1) to wireless access point 118(2) therefore does not affect the logical operating environment of mobile phone 122. For example, mobile phone 122 can continue to access resources of VLAN 144(1) even though mobile phone 122 is now being supported by a wireless access point 118 of neighboring unit 106(2). Additionally, mobile phone 122 continues to experience characteristics of VLAN 144(1), such as a particular quality of service (QoS) associated with VLAN 144(1), a particular bandwidth associated with VLAN 144(1), redundant communication links associated with VLAN 144(1), etc. even though mobile phone 122 is now being supported by a wireless access point 118 of neighboring unit 106(2). Additionally, it should be noted that wireless access point 118(2) is now supporting two VLANs, i.e., VLAN 144(1) as well as VLAN 144(2). In certain embodiments, each wireless access point 118 marks data associated with a given network client with an identifier associating the data with the particular VLAN 144 that network client is part of, to facilitate routing of the data.

Moreover, mobile phone 124 has been moved from unit 106(2) to unit 106(1) in communication environment 400. Accordingly, mobile phone 124 is now served by wireless access point 118(1) of unit 106(1), instead of by wireless access point 118(2) of unit 106(2). Nevertheless, mobile phone 124 is still part of VLAN 144(2), as illustrated in FIG. 4, and the relocation of mobile phone 124 from unit 106(2) to 106(1) therefore does not change the logical operating environment of mobile phone 124.

In certain embodiments, wireless access points 118 and/or communication network gateway 104 are configured to limit use of communication resources by a network client that is not part of a primary VLAN 144 supported by a wireless access point 118. For example, in particular embodiments, wireless access point 118(2) is configured to limit use of communication network resources by mobile phone 122, which is not part of primary VLAN 144(2) supported by wireless access point 118(2), to prevent support of mobile phone 122 from degrading service of network clients of VLAN 144(2). Examples of communication network resources that may be limited include, but are not limited to, one or more of maximum communication bandwidth, minimum MCS, and access to prioritized communication resources.

Referring again to FIG. 1, particular embodiments of communication network gateway 104 support one or more portals to enable communication network gateway 104 to receive commands from an external entity, e.g., from a person and/or from a system external to communication network gateway 104. Additionally, some embodiments of communication network gateway 104 support one or more portals to enable communication network gateway 104 to provide status information, e.g., status of wireless access points 118, status of communication termination devices 108, status of VLANs 144, and/or status of network clients, to an external entity, such as a person and/or an external system. Such aforementioned portals include, for example, one more web interfaces and/or one or more APIs.

For example, certain embodiments of communication network gateway 104 support a respective user portal for each unit 106, thereby enabling an occupant of each unit 106 to configure one or more parameters of their respective VLAN 144, such as one or more of (a) identify of network clients that are permitted to access their VLAN 144, (b) security credentials for their VLAN 144, (c) SSID for their VLAN 144, (d) parental controls for their VLAN 144, (e) a backup communication link for their VLAN 144, e.g., use a mobile phone Wi-Fi hotspot or analogous device, (f) a primary communication service provider 142 for their VLAN 144, (g) a secondary, e.g., backup, communication service provider 142 for their VLAN 144, (h) a list of guest network clients that are permitted to join their VLAN 144 or a dedicated guest VLAN, etc. Alternately or additionally, a user portal may enable an occupant of each unit 106 to obtain status of their respective VLAN 144 and/or status of network clients being served by their respective VLAN 144.

For instance, a user portal may enable an occupant of a given unit 106 to obtain a list of network clients currently being served by their respective VLAN 144 and/or a list of guest network clients being served by their respective VLAN 144 or a guest VLAN.

Figures 5, 6:
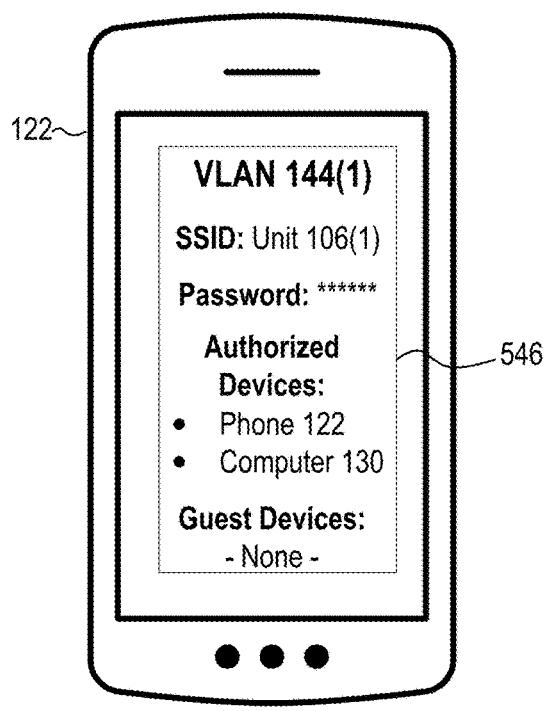
FIG. 5 illustrates an example scenario where an occupant of a unit of the FIG. 1 MDU building accesses an application on a mobile phone to enable the occupant to configure one or more parameters of a virtual local area network (VLAN) associated with the occupant's unit, according to an embodiment.
FIG. 6 illustrates an example scenario where a technology administrator accesses an administration portal of the FIG. 1 communication network gateway to configure one or more parameters of wireless access points and VLANs, according to an embodiment.

FIG. 5 illustrates an example scenario where an occupant of unit 106(1) accesses an application 546 on mobile phone 122 to enable the occupant to configure one or more parameters of VLAN 144(1) and/or obtain status of VLAN 144(1). FIG. 5 illustrates that the occupant can configure the following parameters of VLAN 144(1) using application 546, although the particular parameters that can be configured may vary as a matter of design choice: (a) a wireless communication network identifier, e.g., a Wi-Fi SSID, (b) VLAN 144(1) credentials, e.g., a password, (c) devices authorized to join VLAN 144(1), e.g., mobile phone 122 and notebook computer 130, and (d) guest devices, if any, authorized to join VLAN 144(1) or a separate guest VLAN (not shown). Guest devices, for example, are isolated from other devices on VLAN 144(1), and/or are limited in amount communication resources, such as bandwidth, that they may use. A guest VLAN, for example, limits devices to accessing the Internet or other predetermined network resources. Application 546 could also be configured to provide status information of VLAN 144(1), such as identity of network clients served by VLAN 144(1), throughput of clients served by VLAN 144(1), identity of authorized guest devices, etc. Application 546 interacts with communication network gateway 104, for example, via an API or an user portal of communication network gateway 104.

As another example, some embodiments of communication network gateway 104 support an administration portal enabling a user, and/or an internal and/or external system, to set one or more operating parameters of wireless access points 118, communication termination devices 108, and VLANs 144. For instance, FIG. 6 illustrates an example scenario where a technology administrator, e.g., associated with management of MDU building 102 and/or a communication service provider 142, accesses an administration portal of communication network gateway 104 via a web interface 646 to configure one or more parameters of wireless access points 118 and VLANs 144. It should be appreciated, though, that communication network gateway 104 could be configured such that these parameters could alternately or additionally be configured in response to commands automatically generated within communication network gateway 104, and/or in response to commands received from a system external to communication network gateway 104. FIG. 6 illustrates that the technology administrator can configured the following parameters using web interface 646, although the particular parameters that can be configured may vary as a matter of design choice: (a) a respective RF channel of each wireless access point 118, (b) a respective RF transmission power of each wireless access point 118, (c) a respective RF channel bandwidth of each wireless access point 118, (d) a minimum MCS for each wireless access point 118, (e) a respective maximum throughput of each VLAN 144, and (f) a respective data cap of each VLAN.

In the FIG. 6 example, wireless access point 118(2) is set to a different RF channel than each of adjacent wireless access points 118(1) and 118(3), to avoid interference. However, wireless access points 118(1) and 118(3), which are distant from each other and therefore unlikely to interfere with each other, as set to a common RF channel to conserve available RF spectrum in MDU building 102. Additionally, wireless access point 118(2) is set to a low RF transmission power because wireless access point 118(2) is proximate to two other wireless access points 118(1) and 118(3) and therefore prone to cause interference. Wireless access points 118(1) and 118(3), in contrast, are each proximate to only one other wireless access point 118, and these two wireless access points are therefore less likely to cause interference than wireless access point 118(2). As such wireless access points 118(1) and 118(3) are set to a higher RF transmission power, i.e., a medium RF transmission power, than wireless access point 118(1). Similarly, each of wireless access points 118(1) and 118(3) are set to a large RF channel bandwidth while wireless access point 118(1) is set to a medium RF channel bandwidth. Alternately, or in addition, wireless access points 118(1), 118(2) and 118(3) are set to a high minimum MCS because they are proximate to each other and therefore prone to cause interference unless limited by transmission rate associated with a high MCS.

The FIG. 6 example also illustrates an example scenario where a respective occupant of each unit 106 subscribes to a different communication service package. In particular, an occupant of unit 106(1) subscribes to a bronze communication service package, an occupant of unit 106(2) subscribes to a silver communication service package, and an occupant of unit 106(3) subscribes to a gold communication service package. Accordingly, VLANs 144(1), 144(2), and 144(3) are set to a maximum throughput of 250 Megabits per second (Mb/s), 1 Gigabit per second (Gb/s), and 10 Gb/s, respectively, such as by one or more of communication service providers 142 via an administration portal of communication network gateway 104. Additionally, VLANs 144(1) and 144(2) have respective data caps set at 1 Terabyte (TB) and 5 TB, respectively, while VLAN 144(3), which is associated with the gold communication service package, has no data cap.

As an additional example, FIG. 7 illustrates an example scenario where a management administrator, e.g., a manager of MDU building 102, accesses an administration portal of communication network gateway 104 via a web interface 746 to add or delete VLANs 144, such as in response an occupant moving into MDU building 102 or in response to an occupant moving out of MDU building 102. Web interface 746 shows that the management administrator has already added VLANs 144(1), 144(2), and 144(3) corresponding to occupant A of unit 106(1), occupant B of unit 106(2), and occupant C of unit 106(3), respectively. Web interface 746 further enables the management administrator to set initial authentication credentials, e.g., an initial password, for each VLAN 144, as well as an initial SSID for each VLAN 144, as illustrated in FIG. 7. Additionally, web interface 746 includes a respective "Delete" button for each VLAN 144 to enable the management administrator to delete the VLAN 144, such as in response to the associated occupant moving out of MDU building 102. Web interface 746 also includes an "Add New VLAN" button to enable the management administrator to establish a new VLAN 144, such as in response to an occupant moving into MDU building 102.

As a further example, FIG. 8 illustrates an example scenario where a technology administrator accesses an administration portal of communication network gateway 104 via a web interface 846 to obtain status of wireless access points 118 and status of VLANs 144. The FIG. 8 example illustrates communication network gateway 104 providing the following status information via web interface 846, although the particular status information that is provided may vary as a matter of design choice: (a) number of network clients served by each VLAN 144, (b) identity of network clients served by each VLAN 144, (c) number and/or identity of guest clients served by each VLAN 144 or by a dedicated guest VLAN, (d) number of network clients served by each wireless access point (WAP) 118, (e) identity of network clients served by each wireless access point 118, (f) interference experienced by each wireless access point 118, and (g) number and/or identity of guest clients served by each wireless access point 118. The FIG. 8 example is based on the configuration of FIG. 1 and assumes that (a) each wireless access point 118 is experiencing low interference and (b) there are currently no active guest clients in communication environment 100.

Referring again to FIG. 1, some embodiments of communication network gateway 104 are configured to detect presence of a rogue wireless access point, i.e., a wireless access point that is not served by communication network gateway 104, such as by controlling wireless access points 118 to detect presence of wireless access point beacons from other wireless access points. Particular embodiments of communication network gateway 104 are configured to help minimize interference from a rogue wireless access point, such as by causing wireless access points 118 in the vicinity of the rogue wireless access point to operate on a different RF channel than the rogue wireless access point. Additionally, some embodiments of communication network gateway 104 are configured to help identify a location of a rogue wireless access point in MDU building 102, such as based on received strength and/or direction of signals transmitted by the rogue wireless access point, or by using data from a plurality of wireless access points 118 to perform triangulation.

Figure 9:
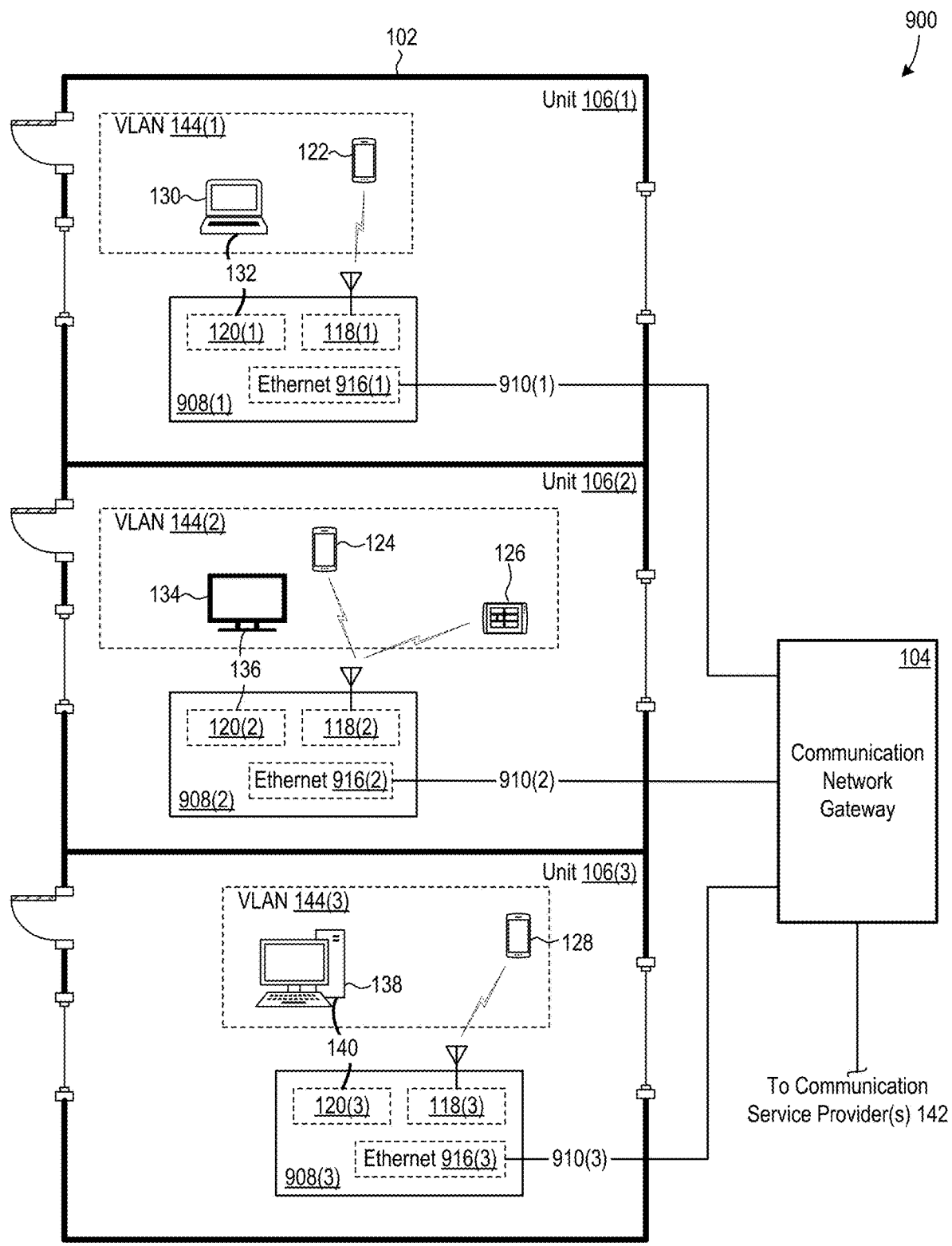
FIG. 9 is a block diagram of an alternate embodiment of the FIG. 1 communication environment where the MDU building includes Ethernet network cables running to each unit.

FIG. 9 is a block diagram of a communication environment 900, which is an alternate embodiment of communication environment 100 of FIG. 1 where MDU building 102 includes Ethernet network cables 910 connecting communication network gateway 104 with each unit 106. Ethernet network cables 910 are, for example, electrical Ethernet cables or optical Ethernet cables. One or more Ethernet network cables 910 may further include connectors (not shown), such as sockets, jacks, plugs, or the like. Additionally, one or more Ethernet network cables 910 may include active devices (not shown), such as repeaters, amplifiers, intermediary Ethernet switches, etc. Communication termination devices 108 are replaced with communication termination devices 908 in communication environment 900. Communication termination devices 908 differ from communication termination devices 108 in that communication termination devices 908 include Ethernet network interfaces 916 in place of network interfaces 116. Each Ethernet network interface 916 is configured to communicatively couple its respective communication termination device 908 to communication network gateway 104 via a respective Ethernet network cable 910. While not required, in certain embodiments of communication environment 900, wireless access points 118 are homogenous, i.e., they are of the same model and/or they are of substantially similar models. Communication network gateway 104 operates in communication environment 900 in substantially the same manner as communication network gateway 104 operates in communication environment 100.

Figure 10:
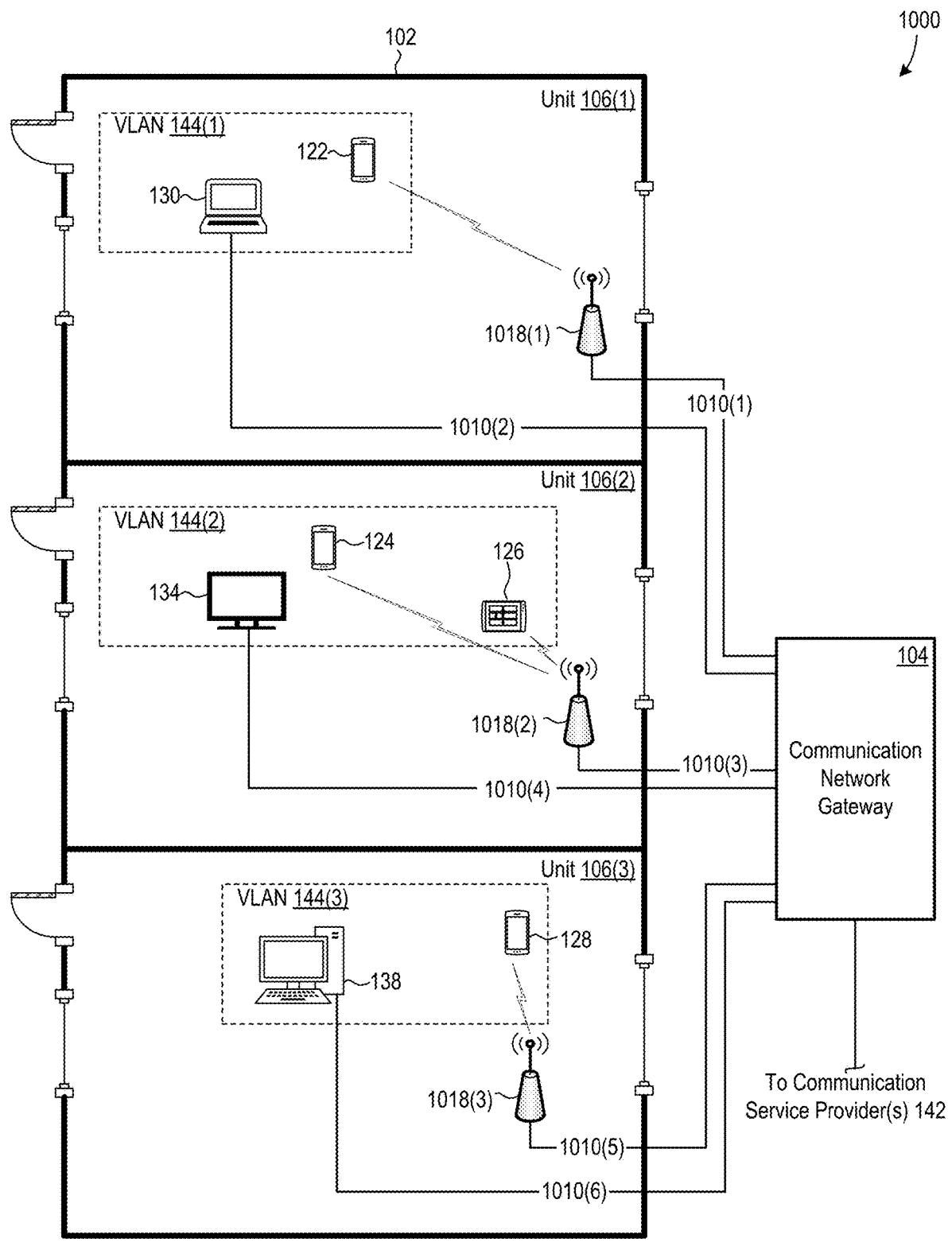
FIG. 10 is a block diagram of an alternate embodiment of the FIG. 1 communication environment where the MDU building includes Ethernet network cables running to each unit and where communication termination devices are omitted.

Communication termination devices are optionally omitted in applications where MDU building 102 includes network cables connecting communication network gateway 104 with each unit 106. For example, FIG. 10 is a block diagram of a communication environment 1000, which is an alternate embodiment of communication environment 100 of FIG. 1 where MDU building 102 includes Ethernet network cables 1010 connecting communication network gateway 104 with each unit 106. Ethernet network cables 1010 are, for example, electrical Ethernet cables or optical Ethernet cables. One or more Ethernet network cables 1010 may further include connectors (not shown), such as sockets, jacks, plugs, or the like. Additionally, one or more Ethernet network cables 1010 may include active devices (not shown), such as repeaters, amplifiers, intermediary Ethernet switches, etc. Communication termination devices 108 are omitted from communication environment 900, and wireless access points 118 of communication environment 100 are replaced with wireless access points 1018 in communication environment. Wireless access points 1018 are alternate embodiments of wireless access points 118 that are communicatively coupled to communication network gateway 104 via respective Ethernet network cables 1010. In some embodiments, wireless access points 1018 are radio heads. Additionally, notebook computer 130, television 134, and computer workstation 138 are communicatively coupled to communication network gateway 104 via respective Ethernet network cables 1010. While not required, in certain embodiments of communication environment 1000, wireless access points 1018 are homogenous, i.e., they are of the same model and/or they are of substantially similar models. In some alternate embodiment, wireless access points 1018 are located outside of units 106, but are in sufficiently close proximity to units 106 to provide adequate coverage in units 106. For examples, wireless access points 1018 could alternately be located in hallways, stairwells, breezeways, etc., that are outside of units 106. In these alternate embodiments, there need not be a one-to-one correspondence between wireless access points 1018 and units 106. For example, two units 106 may be served by a common wireless access point 1018 located in a hallway outside of the units 106, such that there are fewer wireless access points 1018 than there are units 106 in MDU building 102. Communication network gateway 104 operates in communication environment 1000 in substantially the same manner as communication network gateway 104 operates in communication environment 100. In an alternate embodiment of communication environment 1000, each unit 106 includes a communication termination device 108, but wireless access points 118 of communication termination devices 108 are disabled in view of wireless access points 1018 being deployed.

Figure 11:
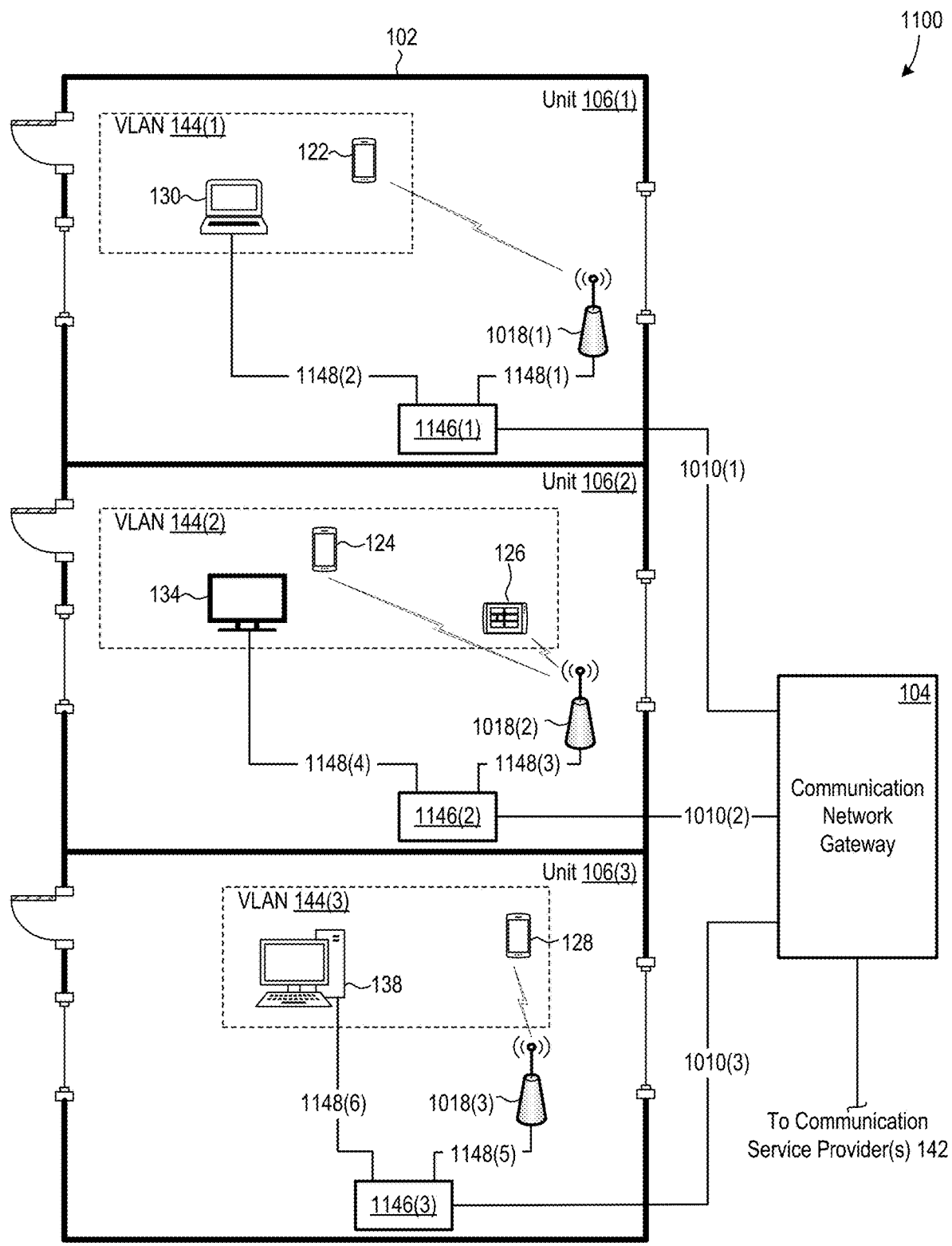
FIG. 11 is a block diagram of an alternate embodiment of the FIG. 10 communication environment including a single Ethernet network cable running to each unit.

FIG. 11 is a block diagram of a communication environment 1100, which is an alternate embodiment of communication environment 1000 including a respective single Ethernet network cable 1010 connecting communication network gateway 104 with each unit 106. Each unit 106 further includes a respective Ethernet switch 1146. Ethernet switch 1146(1) of unit 106(1) communicatively couples each of wireless access point 1018(1) and notebook computer 130 to Ethernet network cable 1010(1) via branch Ethernet network cables 1148(1) and 1148(2), respectively. Additionally, Ethernet switch 1146(2) of unit 106(2) communicatively couples each of wireless access point 1018(2) and television 134 to Ethernet network cable 1010(2) via branch Ethernet network cables 1148(3) and 1148(4), respectively. Furthermore, Ethernet switch 1146(3) of unit 106(3) communicatively couples each of wireless access point 1018(3) and computer workstation 138 to Ethernet network cable 1010(3) via branch Ethernet network cables 1148(5) and 1148(6), respectively.

Figure 12:
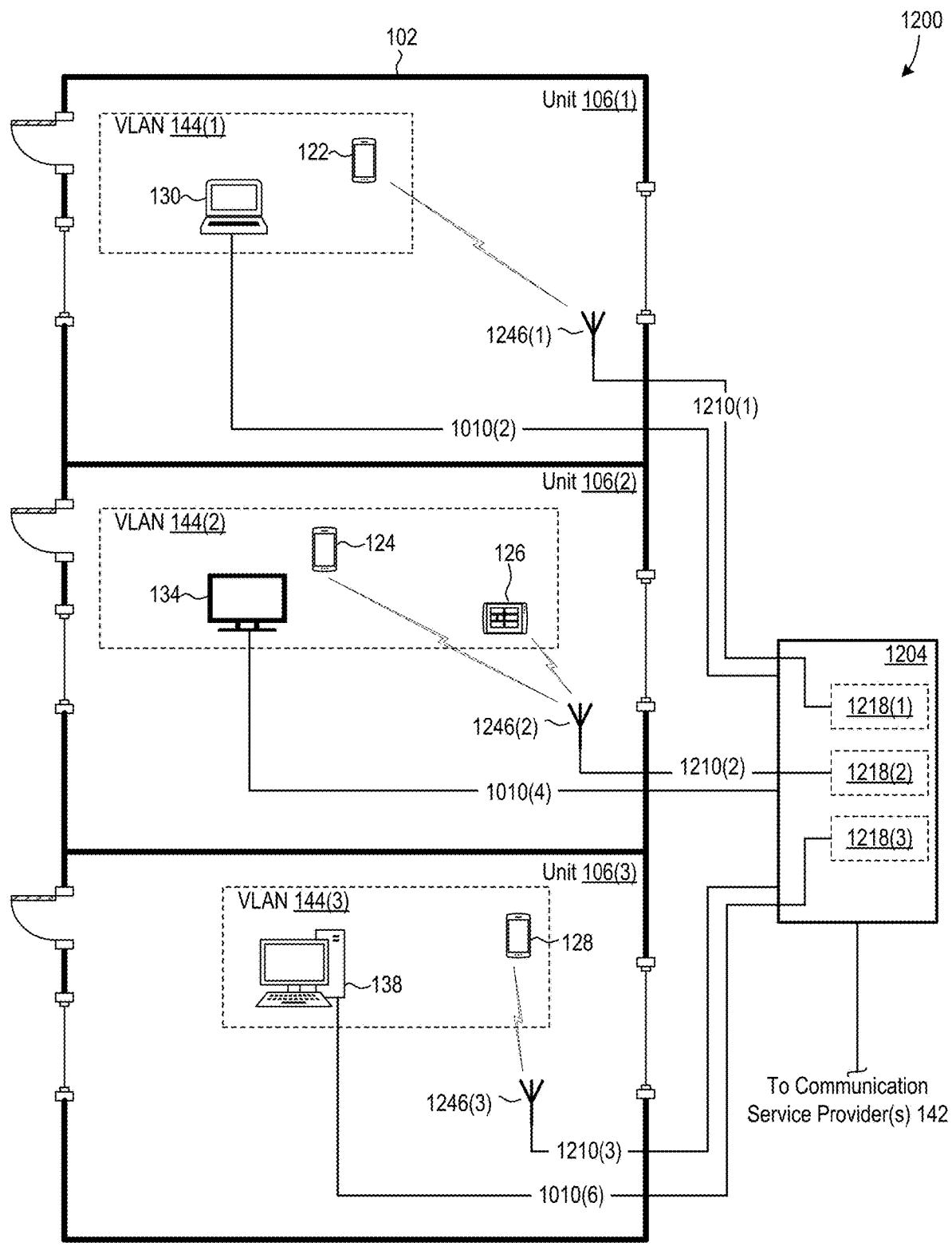
FIG. 12 is a block diagram of an alternate embodiment of the FIG. 10 communication environment where the network communication gateway is replaced with an alternate embodiment network communication gateway including integrated wireless access points.

FIG. 12 is a block diagram of a communication environment 1200, which is an alternate embodiment of communication environment 1000 of FIG. 10 where communication network gateway 104 is replaced with a communication network gateway 1204 including integrated wireless access points 1218 with respective remote antennas 1246 communicatively coupled to communication network gateway 1204 via waveguides 1210. Each waveguide 1210 includes, for example, a coaxial electrical cable. Wireless access points 1218 are an embodiment wireless access points 118 of communication environment 100. FIG. 12 depicts there being a one-to-one correspondence between wireless access points 1218 and units 106, i.e., there is a respective wireless access point 1218 for each unit 106, and each wireless access point 1218 has its remote antenna located in its respective unit 106. In some alternate embodiments, remote antennas 1246 are located outside of units 106, but are in sufficiently close proximity to units 106 to provide adequate coverage in units 106. In these alternate embodiments, there need not be a one-to-one correspondence between wireless access points 1218 and units 106. Communication network gateway 1204 operates in communication environment 1200 in substantially the same manner as communication network gateway 104 operates in communication environment 100.

Figure 13:
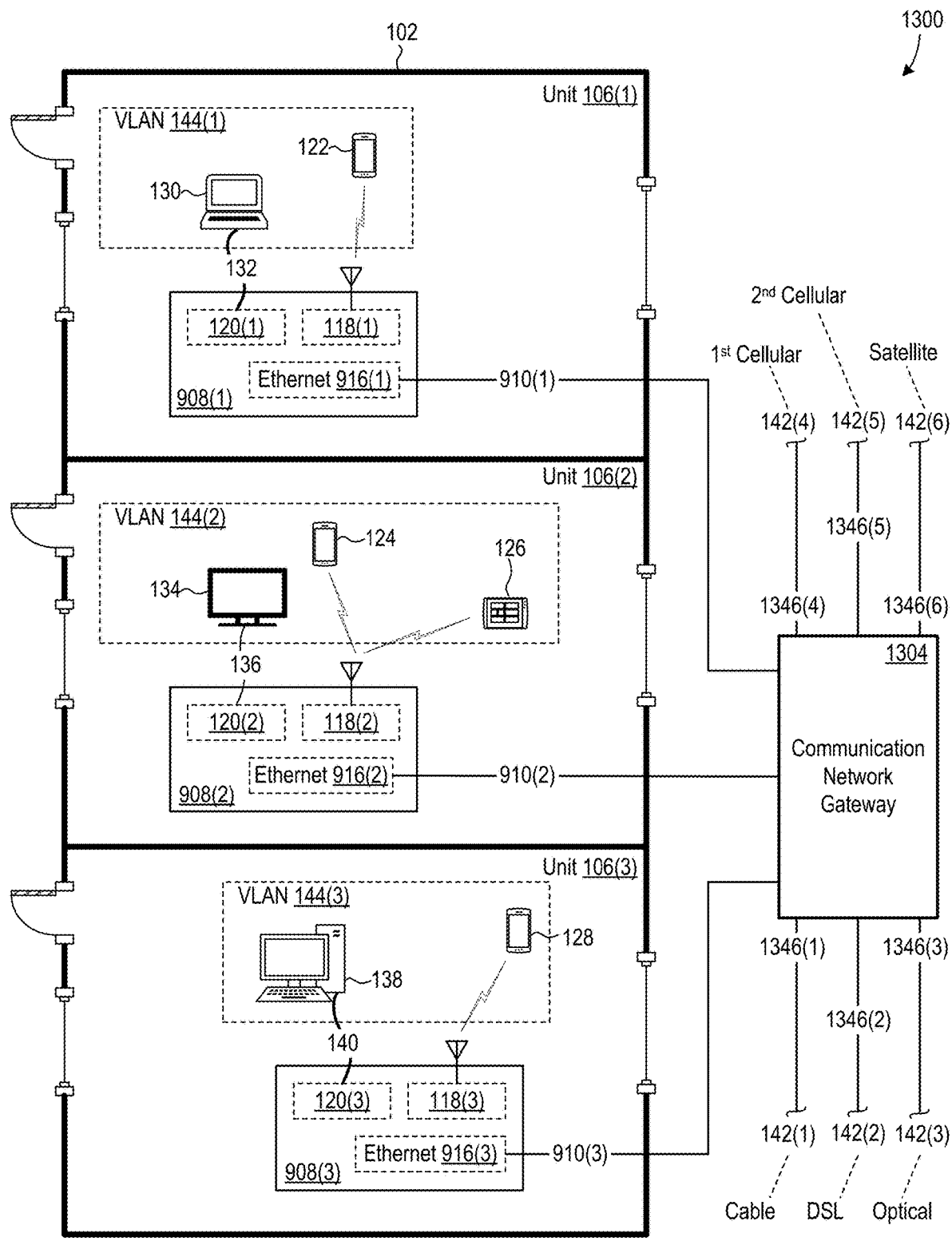
FIG. 13 is a block diagram of an alternate embodiment of the FIG. 9 communication environment where the network communication gateway is replaced with an alternate embodiment network communication gateway configured to achieve convergence of a plurality of communication service providers.

Any of the communication network gateways discussed above could be modified to achieve convergence of communication service providers at the communication network gateway. For example, FIG. 13 is a block diagram of a communication environment 1300, which is an alternate embodiment of communication environment 900 (FIG. 9) where communication network gateway 104 is replaced with a communication network gateway 1304. Communication network gateway 1304 is an alternate embodiment of communication network gateway 104 that is further configured to achieve convergence of a plurality of communication service providers 142. In particular, communication network gateway 1304 supports a respective communication link 1346 with each of the plurality of communication service providers 142. In the FIG. 13 example, communication network gateway 1104 supports a respective communication link 1346 with each of (a) a cable communication service provider 142(1), (b) a DSL communication service provider 142(2), (c) an optical communication service provider 142(3), (d) a first cellular communication service provider 142(4), (e) a second cellular communication service provider 142(5), and (f) a satellite communications service provider 142(6). However, the quantity of communication links 1346 supported by communication network gateway 1304, as well as the type of communication service providers 142 corresponding to communication links 1346, may vary, such as based on the number of communication service providers offering service at the location of MDU building 102. Communication service providers 142 could be public communication service providers, private communication service providers, or a combination of public and private communication service providers.

In particular embodiments, communication network gateway 1304 serves as a single point of presence of each communication service provider 142 at MDU building 102. Consequently, MDU building 102 need not include communication infrastructure for communication service providers 142 in units 106, which promotes low cost and complexity of providing communication service to units 106. Additionally, the fact that communication network gateway 1304 serves as a single point of presence for each communication service provider 142 at MDU building 102 may promote high communication service performance, such as by reducing opportunity for noise funneling into infrastructure of cable communication service provider 142(1). Furthermore, the fact that communication network gateway 1304 serves as a single point of presence for each communication service provider 142 at MDU building 102 promotes energy efficiency by potentially eliminating the need for power consuming communication infrastructure in each unit 106.

Communication network gateway 1304 is configured to route data between VLANs 144 and any one of communication service providers 142. In some embodiments, communication network gateway 1304 is configured to associate each VLAN 144 with a respective one of communication service providers 142, such as based on occupant preference, and route data between each VLAN and its associated communication service provider 142. For example, assume that (a) an occupant of unit 106(1) prefers to receive communication service from cable communication service provider 142(1), (b) an occupant of unit 106(2) prefers to receive communication service from optical communication service provider 142(3), and (c) an occupant of unit 106(3) prefers to receive communication service from cable communication service provider 142(1). In this scenario, communication network gateway 1304 would accordingly (a) associate VLAN 144(1) with cable communication service provider 142(1), (b) associate VLAN 144(2) with optical communication service provider 142(3), and (c) associate VLAN 144(3) with cable communication service provider 142(1). Communication network gateway 1304 would then route uplink and downlink data according to the communication service provider 142 associated with the VLAN 144. In particular, communication network gateway 1304 would (a) route uplink data from VLAN 144(1) to cable communication service provider 142(1), (b) route downlink data destined for VLAN 144(1) from cable communication service provider 142(1) to VLAN 144(1), (c) route uplink data from VLAN 144(2) to optical communication service provider 142(3), (d) route downlink data destined for VLAN 144(2) from optical communication service provider 142(3) to VLAN 144(2), (e) route uplink data from VLAN 144(3) to cable communication service provider 142(1), and (f) route downlink data destined for VLAN 144(3) from cable communication service provider 142(1) to VLAN 144(3).

Additionally, some embodiments of communication network gateway 1304 are configured to change association of VLANs 144 with communication service providers 142, such as in response to anomaly with a current communication service provider 142 associated with a given VLAN 144. For example, assume that (a) VLAN 144(2) is associated with DSL communication service provider 142(2), and (b) cable communication service provider 142(1) is designated as a secondary or backup communication service provider for VLAN 144(2). Certain embodiments of communication network gateway 1104 may be configured to automatically change association of VLAN 144(2) from DSL communication service provider 142(2) to cable communication service provider 142(1) in response to an anomaly with DSL communication service provider 142(2), and thereby maintain communication service continuity for VLAN 144(2). Examples of anomaly with a communication service provider 142 include, but are not limited to, failure of the communication service provider 142, bandwidth provided by the communication service provider 142 dropping below a threshold value, packet loss experienced by the communication service provider 142 rising above a threshold value, latency experienced by the communication service provider 142 rising above a threshold value, and/or cost for data transmission charged by the communication service provider 142 rising above a threshold value.

Furthermore, some embodiments of communication network gateway 1304 are configured to aggregate communication resources, such as bandwidth, of a plurality communication links 1346. For example, assume that an occupant of unit 106(1) desires to receive very high bandwidth communication service for its respective network clients, i.e., network clients of VLAN 144(1). Certain embodiments of communication network gateway 1304 may be configured to aggregate communication resources of two or more of communication links 1346 and provide the aggregated communication resources to VLAN 144(1).

Figure 14:
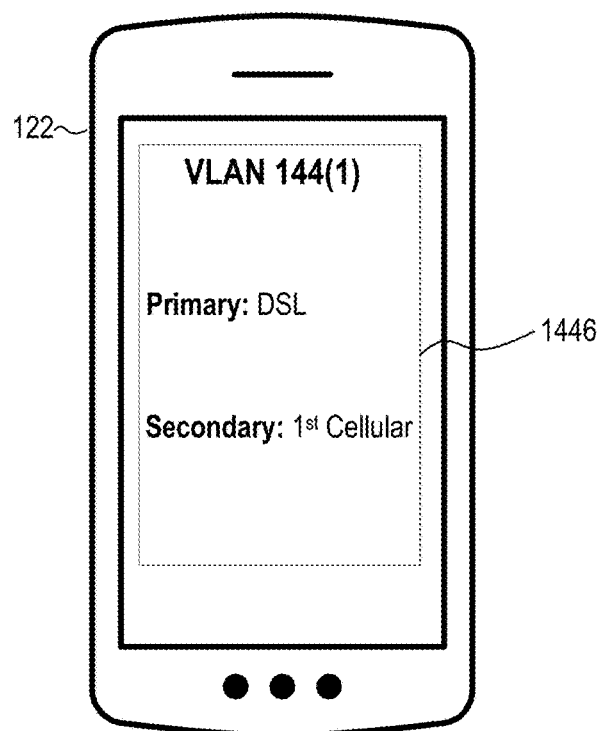
FIG. 14 illustrates an example scenario where an occupant of a unit of the FIG. 1 MDU building accesses an application on a mobile phone to select a primary communication service provider and a secondary communication service provider, according to an embodiment.

Moreover, particular embodiments of communication network gateway 1304 are configured to enable an occupant of a unit 106 to establish communication service with a communication service provider 142, change primary and/or secondary communication service providers 142, and/or terminate communication service with a communication service provider 142, via a user portal. For example, FIG. 14 illustrates an example scenario where a user, e.g., an occupant of unit 106(1), accesses an application 1446 on mobile phone 122 to enable the occupant to select a primary communication service provider 142 and a secondary communication service provider 142. Application 1446 interacts with communication network gateway 104, for example, via an API of a user portal of communication network gateway 104. In this example, the user selects DSL communication service provider 142(2) as a primary communication service provider and first cellular communication service provider 142(4) as a secondary or backup communication service provider, as illustrated in FIG. 14. In response thereto, communication network gateway 1304 associates VLAN 144(1) with DSL communication service provider 142(2), and communication network gateway 1304 designates first cellular communication service provider 142(4) as a secondary or backup communication service provider for VLAN 144(1). Application 1446 and/or communication network gateway 1304 optionally also notify DSL communication service provider 142(2) and first cellular communication service provider 142(4) of the user's selections, such as for provisioning purposes and/or billing purposes.

Figure 15:
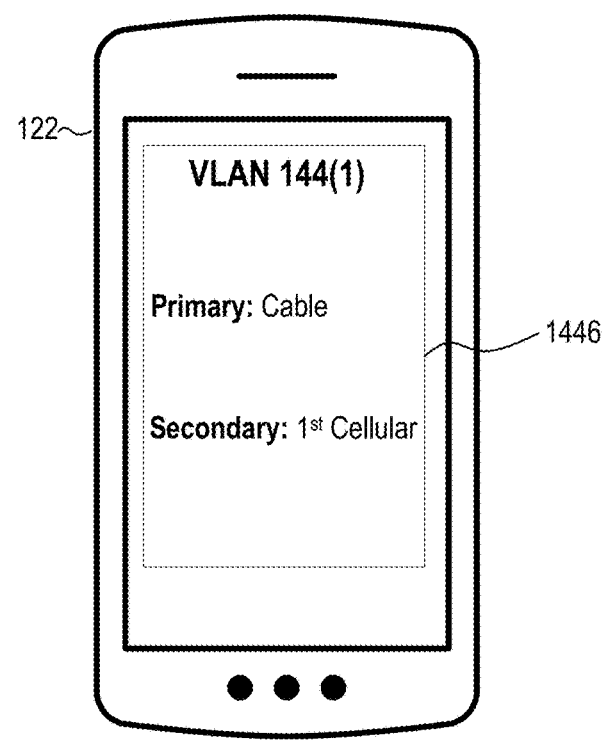
FIG. 15 illustrates an example scenario where an occupant of a unit of the FIG. 1 MDU building accesses an application on a mobile phone to change a primary communication service provider, according to an embodiment.

Now assume that the user becomes dissatisfied with communication service from DSL communication service provider 142(2). The user may again access application 1446 on mobile phone 122 and change the primary communication service provider from DSL communication service provider 142(2) to cable communication service provider 142(1), as illustrated in FIG. 15. In response thereto, communication network gateway 1304 may change association of VLAN 144(1) from DSL communication service provider 142(2) to cable communications service provider 142(1). Application 1446 and/or communication network gateway 1304 optionally also notify DSL communication service provider 142(2) and cable communication service provider 142(1) of the user's change in selections.

Figure 16:
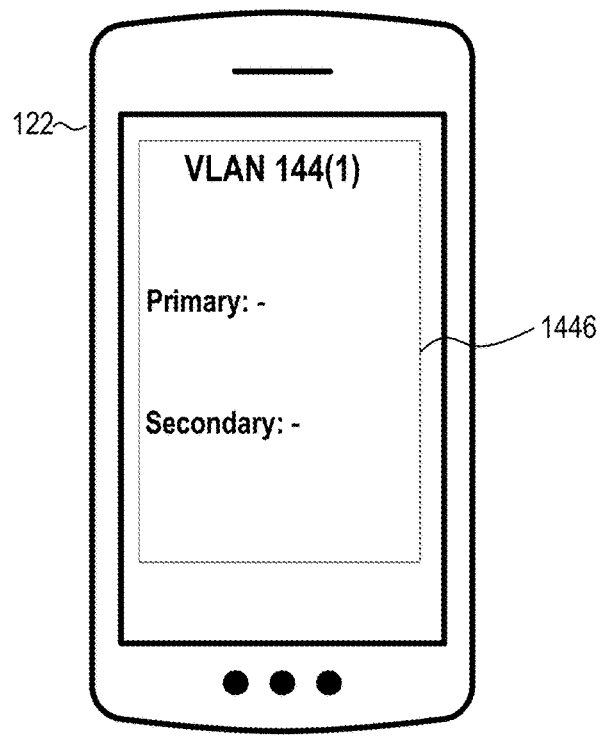
FIG. 16 illustrates an example scenario where an occupant of a unit of the FIG. 1 MDU building accesses an application on a mobile phone to disconnect communication service, according to an embodiment.

Now assume that the user is getting ready to move out of MDU building 102 and therefore wishes to disconnect communication service from unit 106(1). The user may again access application 1446 on mobile phone 122 and disconnect both primary and secondary communication service, as illustrated in FIG. 16. In response thereto, communication network gateway 1304 disassociates VLAN 144(1) from cable communication service provider 142(1) and also deletes first cellular communication service provider 142(4) as a secondary or backup communication service provider for VLAN 144(1). Application 1446 and/or communication network gateway 1304 optionally also notify cable communication service provider 142(1) and first cellular communication service provider 142(4) of the user's disconnection of communication service.

Referring again to FIG. 13, certain embodiments of communication network gateway 1304 are configured to simultaneously associate one or more VLANs 144 with two or more communication service providers 142. For example, in embodiments where wireless access points 118 are capable of communicating with network clients using one or more Wi-Fi wireless communication protocols and one or more cellular wireless communication protocols, communication network gateway 1304 is optionally configured to simultaneously associate each VLAN 144 with (a) a communication service provider 142 for serving Wi-Fi and wired network clients (b) one or more cellular communication service providers 142 for serving cellular network clients.

Communication environment 1300 could be modified to replace Ethernet network cables 910 with one or more other types of communication mediums, e.g., coaxial electrical cable, twisted pair electrical cable, or fiber optic cable, with appropriate changes to communication termination devices 908, e.g., by replacing Ethernet network interfaces 916 with coaxial electrical cable interfaces, twisted pair electrical cable interfaces, or fiber optic cable interfaces. Additionally, each communication termination device 908 need not be communicatively coupled to communication network gateway 1304 using the same type of communication medium.

Figure 17:
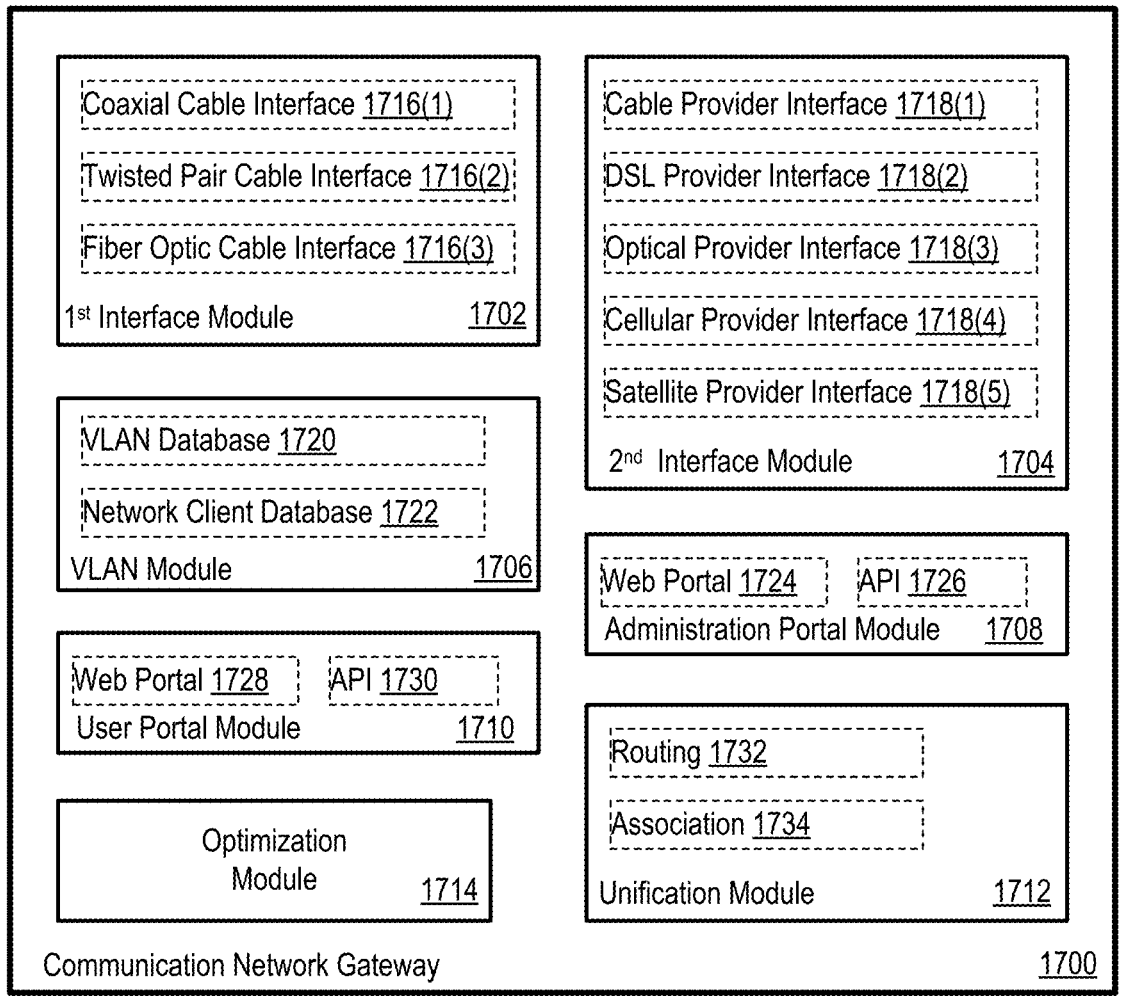
FIG. 17 is a block diagram of one possible embodiment of the communication network gateway of FIG. 13.

FIG. 17 is a block diagram of a communication network gateway 1700, which is one possible embodiment of communication network gateway 1304 of FIG. 13. It is understood, though, that communication network gateway 1304 is not limited to the FIG. 17 example embodiment.

Communication network gateway 1700 includes a first interface module 1702, a second interface module 1704, a VLAN module 1706, an administration portal module 1708, a user portal module 1710, a unification module 1712, and an optional optimization module 1714. Modules 1702-1714 are implemented, for example, by analog and/or digital electronic circuitry. Additionally, in some embodiments, one or more of modules 1702-1714 are at least partially implemented by a processing system executing instructions in the form of software and/or firmware. While modules 1702-1704 are illustrated as being discrete elements, two or more of the elements may be at least partially combined. Furthermore, modules 1702-1714, as well as constituent elements of a given module, need not be co-packaged or even disposed at a common location. For example, in certain embodiments, one or more of modules 1702-1714 are at least partially implemented in a distributed computing environment, such as a cloud computing environment.

First interface module 1702 is configured to communicatively interface communication network gateway 1304 with communication termination devices 108, e.g., using one or more of coaxial electrical cable 110, twisted pair electrical cable 112, fiber optic cable 114, power line 212, and wireless communication signals 214. Certain embodiment of first interface module 1702 include at least one interface for each type of communication medium that first interface module 1702 connects to. For example, FIG. 17 illustrates first interface module 1702 including a coaxial electrical cable interface 1716(1), a twisted pair electrical cable interface 1716(2), and a fiber optic cable interface 1716(3). In some embodiments, first interface module 1702 is configured to communicate with communication termination devices 108 using one or more of an Ethernet communication protocol, a DOCSIS communication protocol, a MoCA communication protocol, a G.hn communication protocol, a DSL communication protocol, an EPON communication protocol, an RFOG communication protocol, a GPON communication protocol, an XPON communication protocol, a CPON communication protocol, a 3GPP communication protocol (e.g., an LTE communication protocol, a 5G communication protocol, or a 6G communication protocol), a power line communication protocol, a Bluetooth communication protocol, a long range (LoRa) wireless communication protocol, a Zigbee wireless communication protocol, a Z-Wave wireless communication protocol, and Wi-Fi direct wireless communication protocol.

Second interface module 1704 is configured to communicatively interface communication network gateway 1304 with communication service providers 142, such as using one or more an Ethernet communication protocol, a DOCSIS communication protocol, a DSL communication protocol, an optical communication protocol (e.g., an EPON communication protocol, an RFOG communication protocol, a GPON communication protocol, an XPON communication protocol, or a CPON communication protocol), a cellular communication protocol (e.g., a 3GPP communication protocol including, but not limited to, an LTE communication protocol, a 5G communication protocol, or a 6G communication protocol), or a satellite communication protocol. Certain embodiments of second interface module 1704 are configured to directly communicatively interface with one or more communication service providers 142, while other embodiments of second interface module 1504 are configured to indirectly communicatively interface with one or more communication service providers 142, e.g., via a modem or an ONT. Certain embodiment of second interface module 1704 include at least one interface 1718 for each type of communication service provider that second interface module 1704 supports a communication link 1346 with. For example, FIG. 17 illustrates second interface module 1704 including a cable provider interface 1718(1), a DSL provider interface 1718(2), an optical provider interface 1718(3), a cellular provider interface 1718(4), and a satellite provider interface 1718(5).

Figure 18:
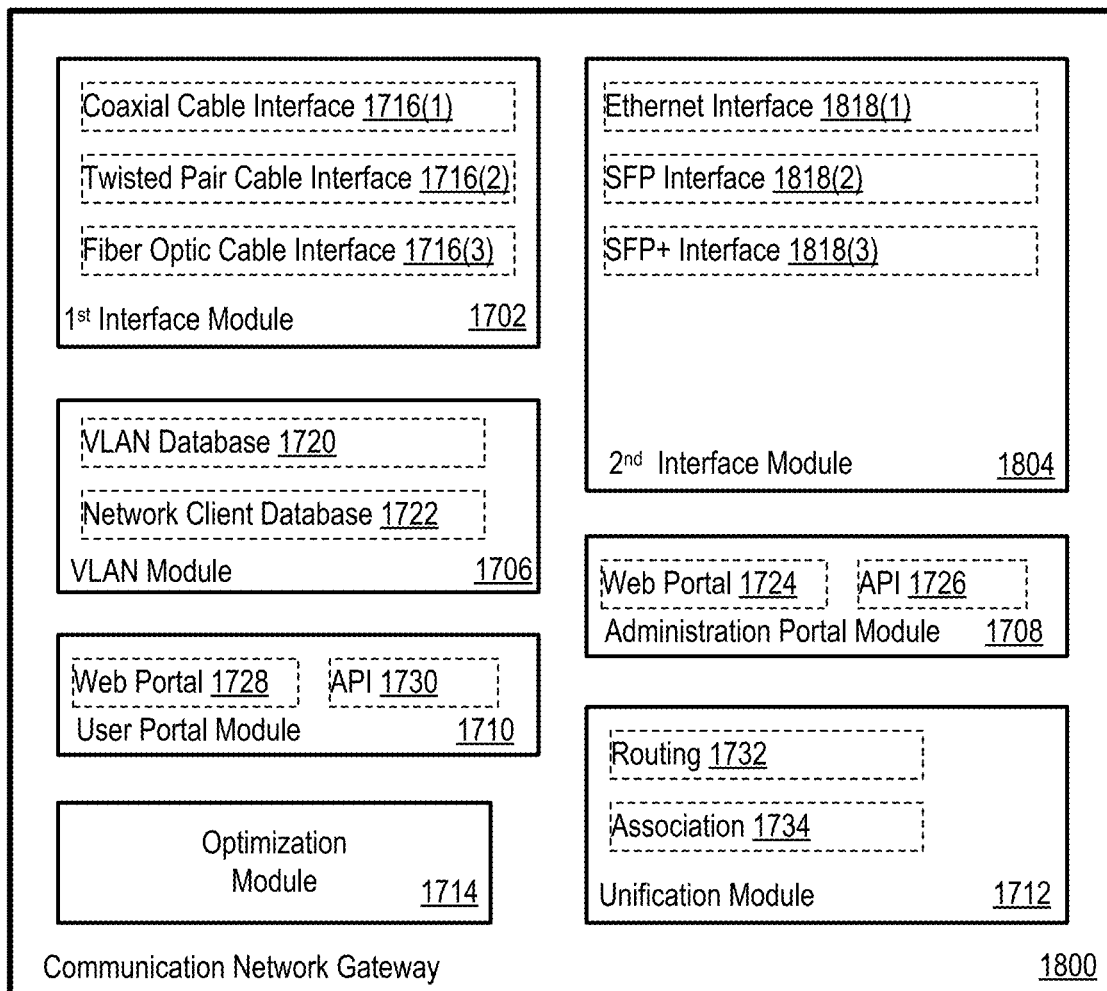
FIG. 18 is a block diagram of an alternate embodiment of the FIG. 17 communication network gateway including general purpose interfaces instead of specific interfaces for each type of communication service provider.

FIG. 18 is a block diagram of a communication network gateway 1800, which is an alternate embodiment of communication network gateway 1700 including a second interface module 1804 in place of second interface module 1704. Second interface module 1804 includes general purpose interfaces, instead of specific interfaces for each type of communication service provider 142. For example, some embodiments of second interface module 1804 include an Ethernet Interface 1818(1), a Small Form-factor Pluggable (SFP) interface 1812(2), and SFP+ interface 1812(3) for communicatively coupling communication network gateway 1800 to communication service providers 142, as illustrated in FIG. 18. A respective termination device for each communication service provider 142, such as a modem, an ONT, or an OLT, may be communicatively coupled to one or more of Ethernet interface 1818(1), SFP interface 1818(2), and SFP+ interface 1818(3).

Referring again to FIG. 17, VLAN module 1706 is configured to establish, maintain, and delete VLANs 144, such as using SDN techniques. Certain embodiments of VLAN module 1706 are configured to automatically establish and/or terminate one or more VLANs 144, such as in response to a signal received from another module of communication network gateway 1700 and/or in response to a signal received from a system external to communication network gateway 1700. For example, in some embodiments, MDU building 102 is an apartment building, and VLAN module 1706 is configured to (a) automatically establish a VLAN 144 for a unit 106 in response to receipt of a signal from a leasing management system (not shown) external to communication network gateway 1700 indicating that a tenant is moving into the unit 106 and (b) automatically delete a VLAN 144 for a unit 106 in response to a receipt of a signal from the leasing management system indicating that a tenant is moving out of the unit 106. Some embodiments of VLAN module 1706 are configured to maintain at least one of (a) a VLAN database 1720 of established VLANs 144 and (b) a network client database 1722 associating each VLAN 144 with one or more network clients authorized to join the VLAN 144.

Administration portal module 1708 is configured to enable administration of communication network gateway 1304, networks supported by communication network gateway 1304, communication links supported by communication network gateway 1304, and/or devices supported by communication network gateway 1304. For example, certain embodiments of administration portal module 1708 are configured to support one or more the administration portals illustrated in FIGS. 6-8. Administration portal module 1708 includes, for example, a web portal 1724 and an API 1726.

User portal module 1710 enables a user, such as an occupant of unit 106, to configure one or more parameters of their respective VLAN 144, such as one or more of (a) identify of network clients that are permitted to access their VLAN 144, (b) security credentials for their VLAN 144, (c) SSID of their VLAN 144, (d) parental controls for their VLAN 144, (e) a backup communication link for their VLAN 144, e.g., by use a mobile phone Wi-Fi hotspot or an analogous device, (f) a primary communication service provider 142 for their VLAN 144, (g) a secondary, e.g., backup, communication service provider 142 for their VLAN 144, (h) control of guest devices permitted to use their VLAN 144 or a separate guest VLAN, etc. Alternately or additionally, a user portal may enable an occupant of each unit 106 to obtain status of their respective VLAN 144 and/or status of network clients being served by their respective VLAN 144. Certain embodiments of user portal module 1710 are configured to support the user portal illustrated in FIG. 5. User portal module 1510 includes, for example, a web portal 1528 and an API 1530.

Unification module 1712 is configured to support aforementioned convergence of a plurality of communication service providers 142 at communication network gateway 1304. For example, unification module 1712 is configured to route 1732 data between VLANs 144 and communication service providers 142 according to an association 1734 of VLANs 144 with communication service providers 142. Additionally, unification module 1712 may be configured to add, change, and modify association 1734 of VLANs 144 with communication service providers 142, such as in response to a user request. Moreover, some embodiments of unification module 1712 are configured to aggregate communication resources of a plurality communication links 1346, as discussed above with respect to FIG. 13.

Optional optimization module 1714 is configured to automatically determine optimum operating parameters of wireless access points 118 and/or VLANs 144, such as by using machine learning, artificial intelligence, or the like. For example, particular embodiments of optimization module 1714 are configured to determine optimum RF transmission power, operating RF channels, RF channel bandwidth, minimum transmission rates, selection of network clients, etc., of wireless access points 118 to help minimize interference among wireless access points 118 and/or optimize communication resources of the wireless access points 118.

Referring again to FIG. 1, communication network gateway 104 could be configured to provide additional content and/or services to occupants of units 106. For example, FIG.

Figure 19:
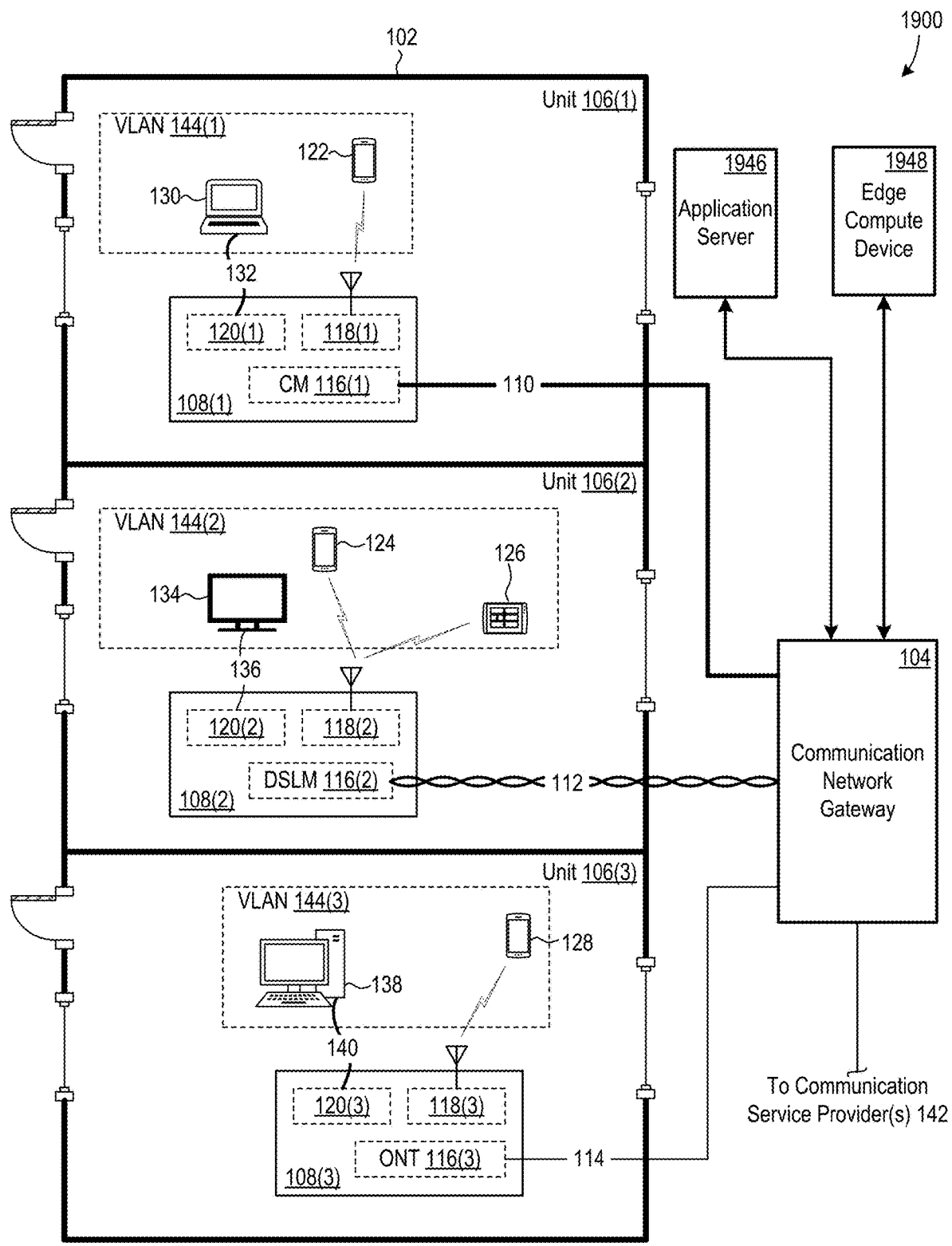
FIG. 19 is a block diagram of an alternate embodiment of the FIG. 1 communication environment further including an application server and an edge compute device.

19 is a block diagram of a communication environment 1900, which is an alternate embodiment of communication environment 100 further including an application server 1946 and an edge computer device 1948 communicatively coupled to communication network gateway 104. In the FIG. 19 embodiment, communication network gateway 104 is configured to receive data from application server 1946 and provide it one or more units 106 via wireless access points 118 and/or wired client interfaces 120. An example of possible data received from application server 1946 and provided to units 106 includes, but is not limited to, data associated with MDU building 102, e.g., data captured by video cameras in MDU building 102, data indicating that an occupant of a unit 106 has received a package or other delivery, data indicating status of amenities of MDU building 102, such as whether a swimming pool is open, etc. Additionally, some embodiments of communication network gateway 104 are configured to receive data from units 106 via wireless access points 118 and/or wired client interfaces 120 and provide said data to application server 1946. Examples of possible data provided to application server 1946 include, but are not limited to, a command to unlock a door, a request to admit a visitor, a command to control heating, ventilation, and air conditioning (HVAC) equipment, etc. Edge compute device 1948 is configured, for example, to provide computing services for occupants and/or devices of MDU building 102, such as computing services requiring low-latency, e.g., on-line gaming, content distribution network caching, precision control, etc.

Figure 20:
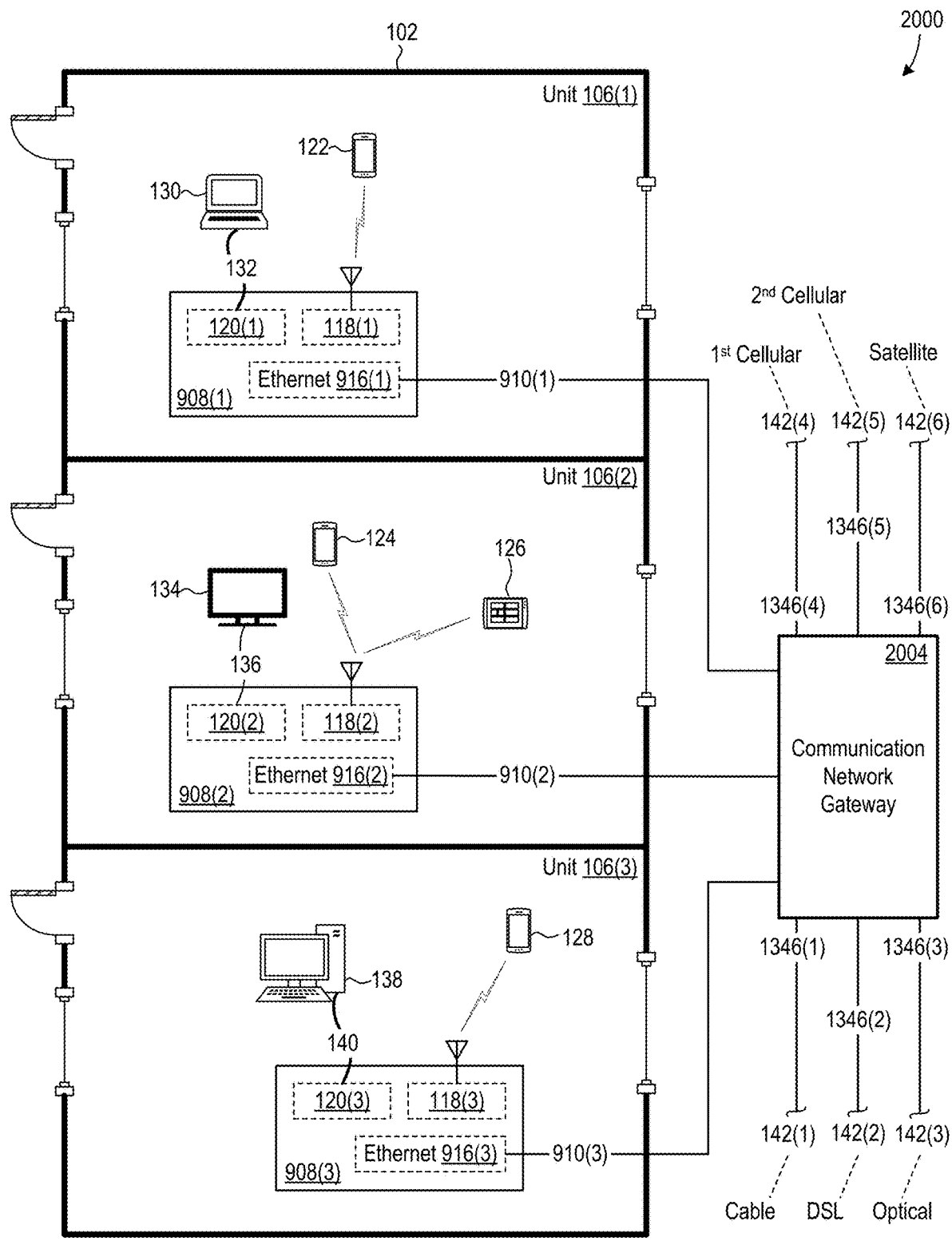
FIG. 20 is a block diagram of an alternate embodiment of the FIG. 13 communication environment including a communication network gateway that does not support VLANs.

Any of the communication network gateways discussed above could be modified to omit support for VLANs and/or to omits support for coordination of wireless access points. For example, FIG. 20 is a block diagram of a communication environment 2000, which is an alternate embodiment of communication environment 1300 (FIG. 13) where communication network gateway 1304 is replaced with a communication network gateway 2004. Communication network gateway 2004 is similar to communication network gateway 1304 except that communication network gateway 2004 does not support VLANs 144. Instead, each communication termination device 908 supports a respective local area network (LAN) for its respective network clients. In an alternate embodiment, communication network gateway 2004 supports a common LAN for all network clients of MDU building 102.

Communication network gateway 2004 operates in a manner similar to communication network gateway 1304 except that communication network gateway 2004 is configured to route data between communication termination devices 908 and any one of communication service providers 142, instead of between VLANs 144 and any one of communication service providers 142. In some embodiments, communication network gateway 2004 is configured to associate each communication termination device 908 with a respective one of communication service providers 142, such as based on occupant preference, and route data between each communication termination device 908 and its associated communication service provider 142. For example, assume that (a) an occupant of unit 106(1) prefers to receive communication service from cable communication service provider 142(1), (b) an occupant of unit 106(2) prefers to receive communication service from optical communication service provider 142(3), and (c) an occupant of unit 106(3) prefers to receive communication service from cable communication service provider 142(1). In this scenario, communication network gateway 2004 would accordingly (a) associate communication termination device 908 (1) with cable communication service provider 142(1), (b) associate communication termination device 908(2) with optical communication service provider 142(3), and (c) associate communication termination device 908(3) with cable communication service provider 142(1). Communication network gateway 2004 would then route uplink and downlink data according to the communication service provider 142 associated with the communication termination device 908. In particular, communication network gateway 2004 would (a) route uplink data from communication termination device 908(1) to cable communication service provider 142(1), (b) route downlink data destined for communication termination device 908(1) from cable communication service provider 142(1) to communication termination device 908(1), (c) route uplink data from communication termination device 908(2) to optical communication service provider 142(3), (d) route downlink data destined for communication termination device 908(2) from optical communication service provider 142(3) to communication termination device 908(2), (e) route uplink data from communication termination device 908(3) to cable communication service provider 142(1), and (f) route downlink data destined for communication termination device 908(3) from cable communication service provider 142(1) to communication termination device 908(3).

Additionally, certain embodiments of communication network gateway 2004 are configured to change association of communication termination devices 908 with communication service providers 142 in a manner analogous to how some embodiments of communication network gateway 1304 are configured to change association of VLANs 144 with communication service providers 142. Furthermore, particular embodiments of communication network gateway 20404 are configured to enable an occupant of a unit 106 to establish communication service with a communication service provider 142, change primary and/or secondary communication service providers 142, and/or terminate communication service with a communication service provider 142, via a user portal, in a manner analogous to that discussed above with respect to FIGS. 14-16. Moreover, certain embodiments of communication network gateway 2004 are configured to simultaneously associate one or more communication termination devices 908 with two or more communication service providers 142 in a manner analogous to how certain embodiments of communication network gateway 1304 are configured to simultaneously associate one or more VLANs 144 with two or more communication service providers 142.

Combinations of Features

Features described above may be combined in various ways without departing from the scope hereof. The following examples illustrate some possible combinations.

(A1) A method operable by a communication network gateway for providing communication services includes the following: (1) supporting respective communication links with a plurality of communication service providers, (2) supporting a plurality of virtual local area networks (VLANs), (3) associating each virtual local area network (VLAN) with a respective communication service provider of the plurality of communication service providers, and (4) routing data between each VLAN and the respective communication link of the respective communication service provider associated with the VLAN.

(A2) In the method denoted as (A1), each VLAN of the plurality of VLANs may be associated with a respective subscriber.

(A3) In either one of the methods denoted as (A1) and (A2), at least two of the plurality of VLANs may be associated with different respective units of a multi-dwelling unit (MDU) building.

(A4) Any one of the methods denoted as (A1) through (A3) may further include changing an association of a first VLAN of the plurality of VLANs from a first communication service provider of the plurality of communication service providers to a second communication service provider of the plurality of communication service providers.

(A5) The method denoted as (A4) may further include changing the association of the first VLAN from the first communication service provider to the second communication service provider in response to a request provided via a user portal.

(A6) The method denoted as (A4) may further include changing the association of the first VLAN from the first communication service provider to the second communication service provider in response to an anomaly with the first communication service provider.

(A7) In any one of the methods denoted as (A4) through (A6), the first communication service provider may be a primary communication service provider for the first VLAN, and the second communication service provider may be a secondary communication service provider for the first VLAN.

(A8) Any one of the methods denoted as (A1) through (A7) may further include aggregating communication resources of the respective communication links with at least two of the plurality of communication service providers.

(A9) In any one of methods denoted as (A1) through (A8), the plurality of communication service providers may include at least two of (a) a cable communication service provider, (b) an optical communication service provider, (c) a digital subscriber line (DSL) communication service provider, (d) a cellular wireless communication service provider, and (e) a satellite communication service provider.

(A10) Any one of the methods denoted as (A1) through (A9) may further include supporting a portal enabling a user associated with a first VLAN of the plurality of VLANs to change which respective communication service provider of the plurality of communication service providers is associated with the first VLAN.

(A11) Any one of the methods denoted as (A1) through (A10) may further include supporting a portal enabling one or more of the plurality of communication service providers to administer communication services provided to one or more of the plurality of VLANs.

(A12) Any one of the methods denoted as (A1) through (A11) may further include supporting a portal enabling administration of the plurality of VLANs.

(B1) A method operable by a communication network gateway for providing communication services includes the following: (1) supporting a first virtual local area network (VLAN) at least partially using a first communication termination device communicatively coupled to the communication network gateway, (2) supporting a second VLAN at least partially using a second communication termination device communicatively coupled to the communication network gateway.

(B2) The method denoted as (B1) may further include coordinating operation of (a) a first wireless access point associated with the first communication termination device and (b) a second wireless access point associated with the second communication termination device.

(B3) The method denoted as (B2) may further include supporting a portal enabling administration of each of (a) the first wireless access point associated with the first communication termination device and (b) the second wireless access point associated with the second communication termination device.

(B4) In any one of the methods denoted as (B1) through (B3), each of the first VLAN and the second VLAN may be accessible via a wireless access point associated with the first communication termination device.

(B5) In any one of the methods denoted as (B1) through (B4), each of the first VLAN and the second VLAN may be accessible via a wireless access point communicatively coupled to the communication network gateway, (B6) In any one of the methods denoted as (B1) through (B5), each of the first communication termination device and the second communication termination device may include one of a cable modem, a digital subscriber line (DSL) modem, an optical network terminal (ONT), a power line communication (PLC) modem, and a wireless modem.

(B7) Any one of the methods denoted as (B1) through (B6) may further include supporting a portal enabling user administration of each of the first VLAN and the second VLAN.

(B8) In any one of the methods denoted as (B1) through (B7), (1) the first communication termination device may be communicatively coupled to the communication network gateway at least partially using a first communication medium, (2) the second communication termination device may be communicatively coupled to the communication network gateway at least partially using a second communication medium, and (3) the second communication medium may be a different type of communication medium than the first communication medium.

(C1) A method operable by a communication network gateway for providing communication services includes the following: (1) supporting respective communication links with a plurality of communication service providers, (2) associating each communication termination device of a plurality of communication termination devices with a respective communication service provider of the plurality of communication service providers, and (3) routing data between each communication termination device and the respective communication link of the respective communication service provider associated with the each communication termination device.

(C2) The method denoted as (C1) may further include changing an association of a first communication termination device of the plurality of communication termination devices from a first communication service provider of the plurality of communication service providers to a second communication service provider of the plurality of communication service providers.

(C3) The method denoted as (C2) may further include changing the association of the first communication termination device from the first communication service provider to the second communication service provider in response to one of (a) a request provided via a user portal and (b) an anomaly with the first communication service provider.

(C4) In any one of the methods denoted as (C1) through (C3), the plurality of communication service providers may include at least two of (a) a cable communication service provider, (b) an optical communication service provider, (c) a digital subscriber line (DSL) communication service provider, (d) a cellular wireless communication service provider, and (e) a satellite communication service provider.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method operable by a communication network gateway for providing communication services, the method comprising:
   supporting respective communication links with a plurality of communication service providers;
   supporting a plurality of virtual local area networks (VLANs);
   associating two or more VLANs of the plurality of VLANs with respective communication service providers of the plurality of communication service providers;
   routing data between each of the two or more VLANs and the respective communication link of the respective communication service provider associated with the VLAN; and
   changing an association of a first VLAN of the two or more VLANs from a first communication service provider of the plurality of communication service providers to a second communication service provider of the plurality of communication service providers.

2. The method of claim 1, wherein each VLAN of the plurality of VLANs is associated with a respective subscriber.

3. The method of claim 1, wherein at least two of the plurality of VLANs are associated with different respective units of a multi-dwelling unit (MDU) building.

4. The method of claim 1, further comprising changing the association of the first VLAN from the first communication service provider to the second communication service provider in response to a request provided via a user portal.

5. The method of claim 1, further comprising changing the association of the first VLAN from the first communication service provider to the second communication service provider in response to an anomaly with the first communication service provider.

6. The method of claim 1, wherein:
   the first communication service provider is a primary communication service provider for the first VLAN; and
   the second communication service provider is a secondary communication service provider for the first VLAN.

7. The method of claim 1, further comprising aggregating communication resources of the respective communication links with at least two of the plurality of communication service providers.

8. The method of claim 1, wherein the plurality of communication service providers includes at least two of (a) a cable communication service provider, (b) an optical communication service provider, (c) a digital subscriber line (DSL) communication service provider, (d) a cellular wireless communication service provider, and (e) a satellite communication service provider.

9. The method of claim 1, further comprising supporting a portal enabling a user associated with the first VLAN to change which respective communication service provider of the plurality of communication service providers is associated with the first VLAN.

10. The method of claim 1, further comprising supporting a portal enabling one or more of the plurality of communication service providers to administer communication services provided to one or more of the plurality of VLANs.

11. The method of claim 1, further comprising supporting a portal enabling administration of the plurality of VLANs.

12. A method operable by a communication network gateway for providing communication services, the method comprising:
    supporting respective communication links with a plurality of communication service providers;
    associating two or more communication termination devices of a plurality of communication termination devices with respective communication service providers of the plurality of communication service providers;
    routing data between each of the two or more communication termination devices and the respective communication link of the respective communication service provider associated with the each communication termination device; and
    changing an association of a first communication termination device of the two or more communication termination devices from a first communication service provider of the plurality of communication service providers to a second communication service provider of the plurality of communication service providers.

13. The method of claim 12, further comprising changing the association of the first communication termination device from the first communication service provider to the second communication service provider in response to one of (a) a request provided via a user portal and (b) an anomaly with the first communication service provider.

14. The method of claim 12, wherein the plurality of communication service providers includes at least two of (a) a cable communication service provider, (b) an optical communication service provider, (c) a digital subscriber line (DSL) communication service provider, (d) a cellular wireless communication service provider, and (e) a satellite communication service provider.

* * * * *